US007771053B2

United States Patent
Polland et al.

(10) Patent No.: US 7,771,053 B2
(45) Date of Patent: Aug. 10, 2010

(54) METHOD AND APPARATUS FOR ONLINE CONTACT LENS EVALUATION

(75) Inventors: Hans-Joachim Polland, Wolfratshausen (DE); Stefan Seitz, Germering (DE); Kristian Hohla, Vaterstetten (DE); Gerhard Youssefi, Landshut (DE); Ernst Hegels, Kirchheim (DE); Birte Jansen, München (DE); Christoph Sappel, Grünwald (DE)

(73) Assignee: Bausch & Lomb Incorporated, Rochester, NY (US)

( * ) Notice: Subject to any disclaimer, the term of this patent is extended or adjusted under 35 U.S.C. 154(b) by 667 days.

(21) Appl. No.: 10/565,877

(22) PCT Filed: Jul. 22, 2004

(86) PCT No.: PCT/EP2004/008201

§ 371 (c)(1),
(2), (4) Date: Feb. 2, 2007

(87) PCT Pub. No.: WO2005/015290

PCT Pub. Date: Feb. 17, 2005

(65) Prior Publication Data

US 2007/0273828 A1 Nov. 29, 2007

(51) Int. Cl.
*A61B 3/00* (2006.01)
*G02C 7/04* (2006.01)
*A61B 3/10* (2006.01)
(52) U.S. Cl. .................................. 351/246; 351/205
(58) Field of Classification Search ................. 351/200, 351/204, 205, 246; 606/107, 161–162, 166
See application file for complete search history.

(56) References Cited

U.S. PATENT DOCUMENTS 5,671,447 A * 9/1997 Tokunaga ..................... 396/51
5,790,235 A   8/1998 Kirschbaum (Continued)

FOREIGN PATENT DOCUMENTS

DE       197 52 595 C1    7/1999

(Continued)

OTHER PUBLICATIONS

PCT/EP2004/008201 Written Opinion of the International Searching Authority dated Feb. 15, 2005.

(Continued)

*Primary Examiner*—Ricky L Mack
*Assistant Examiner*—James R Greece

(57) ABSTRACT

A selectively marked contact lens having, in one aspect, marks in an optical zone region on a surface thereof and, in another aspect, different marks outside an optical zone region of the lens, for an in-vivo lens. With the lens in-vivo, the subject's eye is illuminated and the lens is imaged. A fast algorithm is used to determine the mark coordinates in relation to a measured pupil coordinate to determine position and/or orientation of the contact lens. A wavefront aberration measurement can also be obtained simultaneously with the contact lens position measurement, as well as pupil size. A fast algorithm provides for online measurements; i.e., at a repetition rate of 10 Hz or greater, over a selected time interval. Blinking periods are determined and anomalous lens position and/or wavefront information is discarded. A most frequently occurring wavefront and/or contact lens position/orientation is determined over the selected time interval.

10 Claims, 30 Drawing Sheets

U.S. PATENT DOCUMENTS

| | | |
|---|---|---|
| 5,963,299 A | 10/1999 | Reyburn |
| 5,983,030 A * | 11/1999 | Nagano ................... 396/51 |
| 6,000,799 A * | 12/1999 | Van de Velde ............ 351/205 |
| 6,076,930 A | 6/2000 | Malchow et al. |
| 6,260,968 B1 | 7/2001 | Stark et al. |
| 2002/0036749 A1 | 3/2002 | Isogai |

FOREIGN PATENT DOCUMENTS

| | | |
|---|---|---|
| DE | 102 41 210 A1 | 3/2004 |
| EP | 0 697 190 A1 | 2/1996 |
| EP | 0 949 528 | 10/1999 |
| JP | 04200524 | 7/1992 |
| WO | WO 01/96908 | 12/2001 |
| WO | WO 02/065899 A2 | 8/2002 |
| WO | WO 2005/015495 | 2/2005 |

OTHER PUBLICATIONS

PCT/EP2004/008201 International Preliminary Report on Patentability dated Jul. 4, 2005.

* cited by examiner

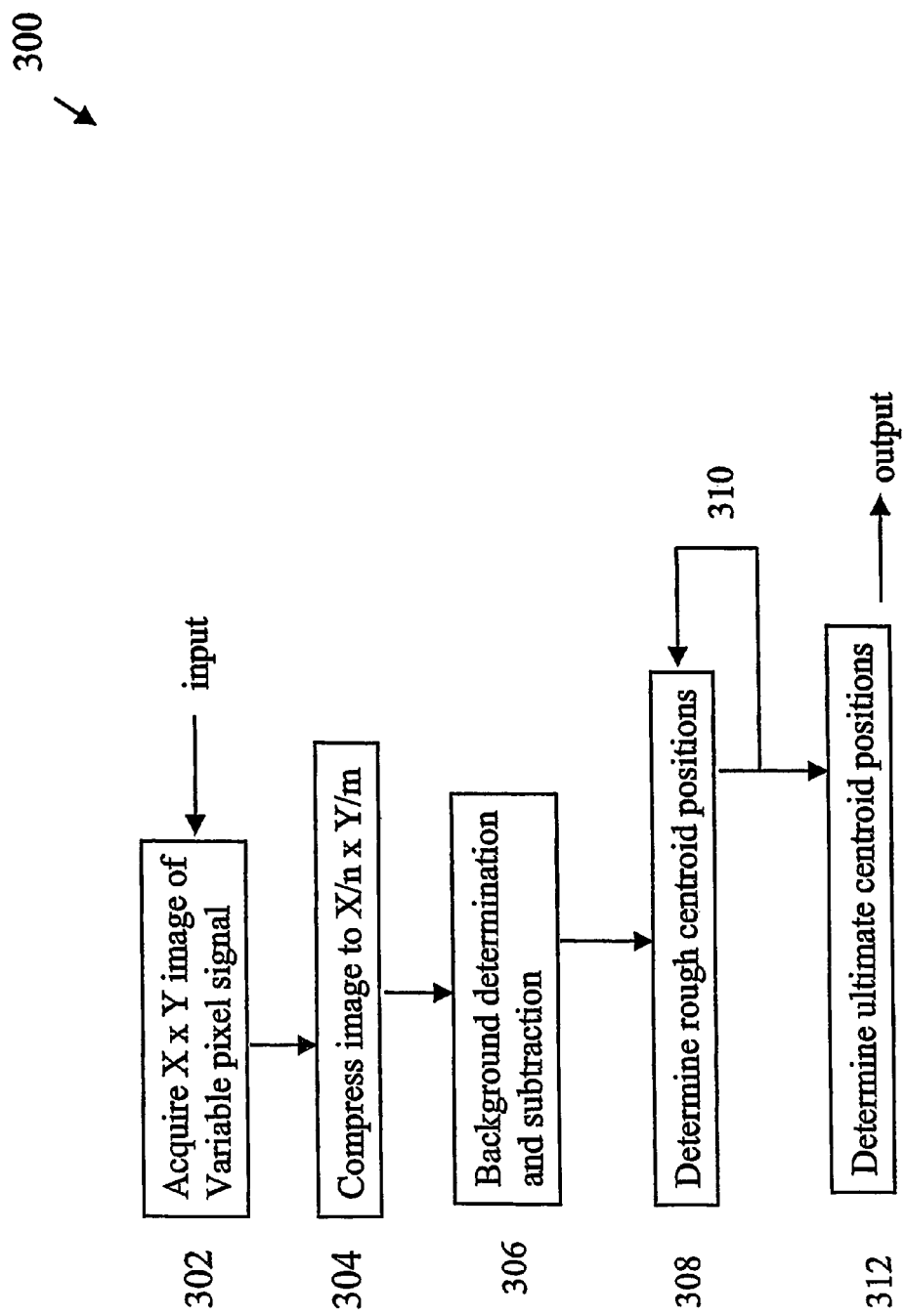

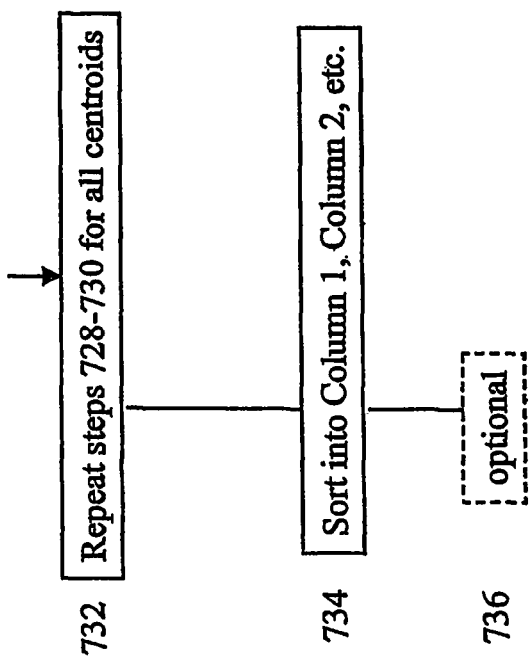
FIG. 7 (con't)

METHOD AND APPARATUS FOR ONLINE CONTACT LENS EVALUATION

This application is a 371 of PCT/EP2004/008201 filed Jul. 22, 2004. This application claims priority from German Patent Application No. 10333794.6 filed on Jul. 24, 2003, which is hereby incorporated by reference herein.

FIELD OF THE INVENTION

Embodiments of the invention are generally related to the applications of ophthalmic wavefront sensing, and more particularly to measuring and evaluating the position and effects of a contact lens in vivo.

DESCRIPTION OF THE RELATED ART

The measurement of a person's vision can be accomplished in many ways. The most traditional method involves a visual acuity measurement in which the patient is asked to read variously sized letters on a distant chart while looking through different lens prescriptions provided by the practitioner. The patient's manifest refraction (i.e., spherical power, cylinder power, and axis) is determined by the patient's choice of the test lenses, which provide the clearest vision of the distant eye chart. Shortcomings of this technique are widely recognized. For example, the test lenses are limited to discrete rather than continuous prescription values; visual acuity is substantially the only vision metric that is evaluated; and the evaluation is subjective rather than objective.

There are added complications when contact lenses are worn by the patient to improve vision. It is well known that the position of a contact lens in vivo is not stable. The tear film on which the lens rides provides a medium that allows the lens to slide in any direction and rotate as a function of gaze direction, blinking, and for other reasons. If the vision defect of the person's eye is not symmetrical over the diameter of the pupil (for example, astigmatism), then the optimum performance of the contact lens will be obtained only when the lens has a particular, stabilized orientation on the eye.

Over the past several years, technologically advanced apparatus and techniques have been developed to measure visual acuity and other vision metrics that provide more accurate and informative results than those obtained in the past. For example, devices known as aberrometers incorporate wavefront sensors that objectively measure aberrations of the patient's eye. These aberrations not only include the manifest refraction values of sphere and cylinder/axis, but also include aberrations such as spherical aberration, coma, and irregular astigmatism, for example, which can significantly impair visual quality in many instances. The accurate measurement of this more complex body of visual defects is important in order to attempt to correct them. Knowledge of the position and stability of a contact lens is especially significant due to the complex association between lens position and aberration control. There is additional value in being able to determine the interaction between contact lens position and aberration control in an online state; i.e., wavefront and in-vivo contact lens information measurement, evaluation, and (optionally) display all in a matter of milliseconds. It is not apparent that until now, online, objective evaluation of contact lens position and stability, along with corresponding pupil parameter and wavefront measurements were possible.

SUMMARY OF THE INVENTION

An embodiment of the invention is directed to a specially marked contact lens suited to online, in-vivo measurement of position and orientation. According to an aspect of this embodiment, the lens's posterior or anterior surface, or the lens body, has a light absorbing or scattering pattern of marks in an optical zone region of the lens. The marks are intended to be illuminated by light that is propagating from the retina outward, and which are then imaged by a CCD detector/camera. This illumination technique provides a contrasting bright pupil image with dark appearing marks. The marks do not affect the vision of a person wearing the contact lens. In various aspects of the embodiment, the marks may be molded marks, laser-ablated marks, lithographically applied marks, and other forms, as one skilled in the art will appreciate. In other various aspects, the marks may be in a pattern having either, or neither, rotational or translational symmetry. Alternatively, the marks may be aligned along a pre-defined curve, along a plurality of straight lines that may or may not intersect, or along lines that intersect in a pre-determined pattern. In an aspect of this embodiment, the marks are each sized to have a diameter of less than about 200 microns; and in another aspect, the marks have a diameter in a range between about 50 microns to 200 microns. In an exemplary aspect, the marks have a mutual separation distance of about 600 microns.

In an alternative aspect of this embodiment, a contact lens is provided having a pattern of colored marks outside of the pupil area of the subject's eye when the lens is in-vivo. These marks are not illuminated from behind, but from the front side if any additional illumination should be necessary. In one variation, the pattern comprises at least three colored marks arranged in a non-rotationally symmetric pattern.

Another embodiment of the invention is directed to a method for objectively evaluating a contact lens in-vivo, online. The in-vivo position and orientation of a specially marked contact lens can be determined objectively with respect to a measured pupil coordinate in a millisecond time frame ("online") over a pre-determined time interval. This provides, among other things, evaluation of the contact lens substantially instantaneously as it is being worn. The evaluation is performed with an aberrometer device and includes the steps of fitting the patient with a selectively marked (described in greater detail below) contact lens, illuminating the patient's eye such that the light scattered from the retina fills the pupil and this outgoing light illuminates the lens marks, imaging the exiting light such that the marks on the lens are resolved, determining a position coordinate bf the pupil (for example, pupil center, pupil orientation), and determining the position of the marks (or other lens reference coordinates) with respect to the pupil coordinates. In an aspect of this embodiment, a Hough transform is used to identify and locate the lens marks and lens position/orientation.

In an alternative aspect of this embodiment associated with a contact lens having a colored mark pattern referred to above, the colored marks outside of the pupil area on the in-vivo lens can be detected with an appropriate filter. This may be preferred if the color of the marks are similar to the subject's iris color. Once the marks are detected, a software routine can be utilized to compare the found mark pattern with the mark structure on the lens to evaluate lens position and orientation.

The online measurement and evaluation of the in-vivo contact lens position can occur at rates of 10 Hz or greater. For example, using an 800 MHz processor allows online processing at a rate of about 25 Hz. A 1.6 GHz processor would substantially double this rate, which is processor speed, rather than algorithm capability, limited. In a related aspect, total wavefront measurements of the eye can be made online, as can pupil size, simultaneously with the contact lens position measurements. In a further aspect, the most frequently occurring wavefront aberration, and, contact lens position, can be determined and optionally displayed. In this regard, co-pending application Ser. No. 10/565,703, entitled ONLINE WAVEFRONT MEASUREMENT AND DISPLAY, filed simultaneously with the instant application, is incorporated by reference in its entirety to the fullest extent allowed by applicable laws and rules. In each of these aspects, blinking intervals can be determined during which times the typically anomalous measurement data and evaluation can be excluded.

The foregoing embodiments of the invention and various aspects thereof will be further set forth in the accompanying figures and in accordance with the detailed description below and as defined in the appended claims.

BRIEF DESCRIPTION OF THE DRAWINGS

FIG. 3 is a block diagram according to another method embodiment according to the invention;

FIG. 22 is a flow chart type diagram that shows the use of the pupil-finder algorithm in an online measurement according to an embodiment of the invention;

FIG. 23 is a flow chart type diagram that shows how various data is evaluated according to the embodied invention;

FIG. 24 is a photocopy of a pupil image according to an exemplary embodiment of the invention;

FIG. 25 is a greyscale image of a compressed and inverted pupil image according to an exemplary embodiment of the invention;

FIG. 26 is a binary image of a compressed pupil image according to an exemplary embodiment of the invention;

FIG. 27 shows the greyscale image of FIG. 25 after noise filtering according to an exemplary embodiment of the invention;

FIG. 28 shows the binary image of FIG. 26 after further reflex filtering according to an exemplary embodiment of the invention;

FIG. 29 is a greyscale image of a compressed and inverted pupil image as in FIG. 25 having a different compression factor according to an exemplary embodiment of the invention;

FIG. 30 is a refined binary pupil image from FIG. 28 according to an exemplary embodiment of the invention;

FIG. 31 is a plot of the difference between the found region and the pupil as a function of x-position relating to eyelid correction according to an exemplary embodiment of the invention;

FIG. 32 is a binary pupil image showing eyelid correction according to an exemplary embodiment of the invention;

DETAILED DESCRIPTION OF A PREFERRED EMBODIMENT

The term "online" as used herein, refers to measuring and evaluating (and optionally displaying) selected phenomena substantially simultaneously. In the embodied applications, this generally means acquiring a wavefront (lenslet) image, analyzing the wavefront data, and (optionally) displaying the results in a time of less than about 100 ms, and typically less than 40 ms, over a selected time interval of ten's of seconds, typically about 10-20 seconds but in no way so limited. For example, according to an illustrative embodiment, the in-vivo position and orientation of a specially marked contact lens, along with pupil size and position, and a selected second through $9^{th}$ Zernike-order aberration are determined and displayed at a rate of 25 Hz over a 10 second interval. 250 image pairs comprising pupil and Hartmann-Shack lenslet images are acquired, from which the instantaneously available (approximately 40 ms/image) data indicates how and where the contact lens moves and the effect of the movement on the measured aberrations that affect vision quality. It will be appreciated that aberration order is dependent upon lenslet pitch/diameter in the Hartmann-Shack technique, and that measurements can be made of aberrations up to $25^{th}$ order.

Figure 20:
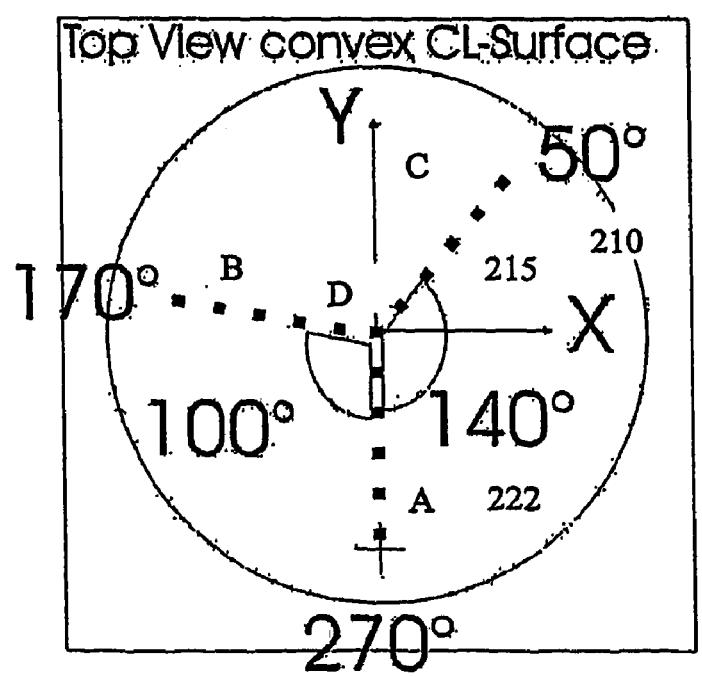
FIG. 20 is a diagrammatic top view of lens marks on a contact lens surface according to an embodiment of the invention.

An embodiment of the invention directed to a specially marked contact lens 210 is illustrated with respect to FIGS. 2, 18, 19 and 20. FIG. 20 shows a top view schematic of a contact lens 210 according to an illustrative embodiment of the invention. The convex lens surface includes a plurality of marks 215 (shown as square marks in FIG. 20) located in a central optical zone region 222 of the lens. When light in an outgoing direction (i.e., scattered and traveling from the retina towards and through the pupil) illuminates the lens, the marks 215 absorb or scatter the light to become visible, and can be imaged by a CCD camera as will be described below. The marks 215 do not affect the vision of the patient wearing the lens.

Figure 18:
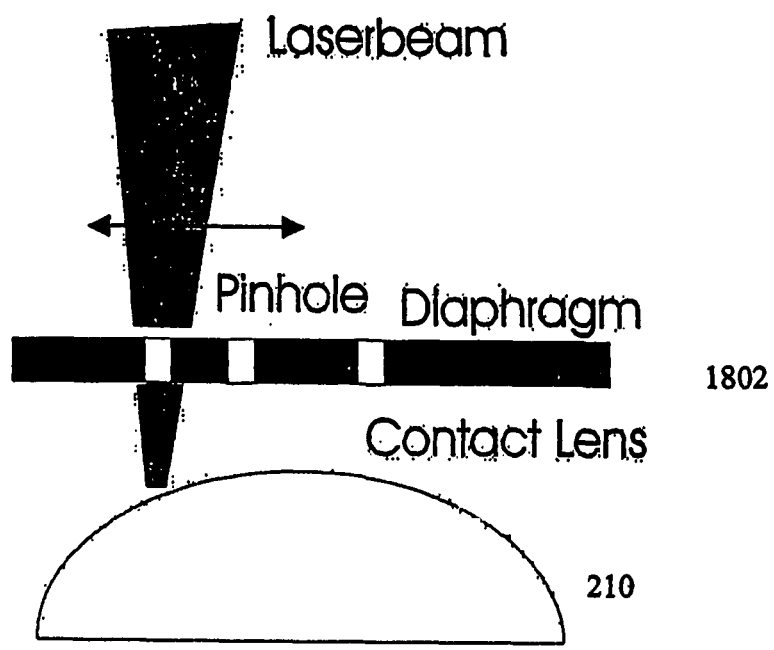
FIG. 18 is a schematic illustration of a contact lens marking process according to an embodiment of the invention.
Figure 19:
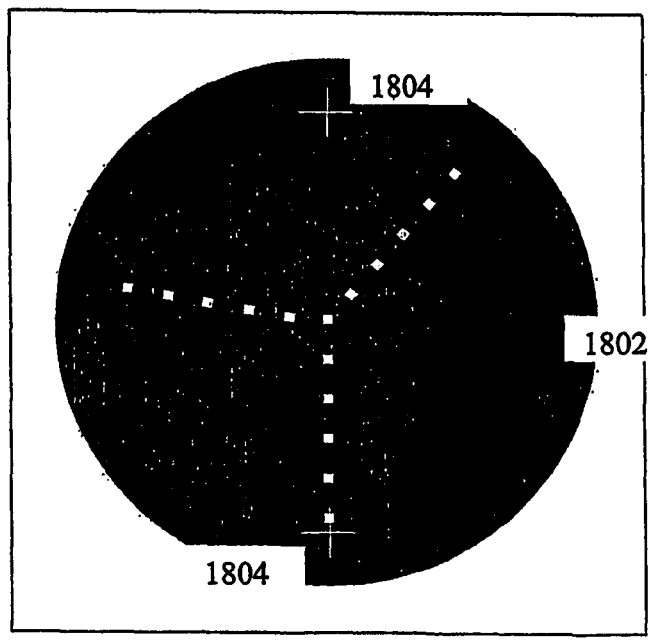
FIG. 19 is a diagrammatic top view of an aperture pattern according to a contact lens marking process embodiment of the invention.

In an exemplary embodiment, the marks 215 are laser-ablated regions on one of the lens surfaces (posterior or anterior), which are formed by sending a laser beam having suitable characteristics through a pinhole aperture diaphragm 1802 as shown schematically in FIGS. 18, 19. The diaphragm 1802 is placed about 2 mm above the contact lens 210 and the laser beam is scanned across the diaphragm as illustrated by the arrow in FIG. 18. The white crosses 1804 in FIG. 19 indicate fixation points of the diaphragm. The marks can alternatively be formed by other means such as, for example, directly ablating selective regions of a lens surface, a molding process, or through a lithographic process. Each of the marks 215 has a size corresponding to a diameter in a range between about 50 microns to 200 microns. In an exemplary aspect, a distance of about 600 microns mutually separates the marks. As shown in FIG. 20, the marks are aligned along three straight lines A, B, C that intersect at a common point D. Each of the lines has a length of about 5 mm. As shown in the figure, lines A and C intersect at an angle of 140°, while lines A and B intersect at an angle of 100°. As further illustrated in FIG. 2, the marks 215 are within the pupil area 208 of the patient's eye with the contact lens in-vivo, although the center 207 of the contact lens may not be identical with the center of the pupil 209. The contact lens may also be rotated. The plurality of marks can be in a pattern that has no rotational symmetry and which may or may not have translational symmetry. The marks may be aligned along one or more predefined curves including intersecting straight lines as described above. When the marks are in a pattern of three straight intersecting lines as shown, the range of intersection angles can be between about 20° to 300°, with a deviation of approximately 10°.

Figure 33:
FIG. 33 is a picture of a subject's eye and contact lens in-vivo having colored dot markings on the lens surface outside of the pupil area according to an aspect of the invention.

In an alternative aspect of the lens embodiment, a lens 3302 (in-vivo) as shown in the photo-image of FIG. 33 has a pattern of colored dots 3304 (only a single dot is shown at the arrow), each approximately 1 mm in diameter, in a part of the lens surface that is outside the pupil region of the subject's eye. In the illustrative aspect shown in FIG. 33, the colored dot 3304 is blue, similar to the color of the subject's iris. In order to measure in-vivo contact lens position and orientation (including lens inversion), a pattern of at least three marks is necessary. The pattern should not have rotational symmetry. It is to be understood that the colored mark pattern is not restricted to dots, as described, nor to a certain number of marks; rather, substantially any non-rotationally symmetric pattern will suffice. Moreover, these markings need not be restricted to a particular surface of the contact lens, nor to a particular region; i.e., a suitably detectable pattern of marks or indicia may be located on the lens rim, inside of an optical zone or outside of the optical zone of the lens, depending on the characteristics of the marks, as a person skilled in the art will appreciate.

Figure 5:
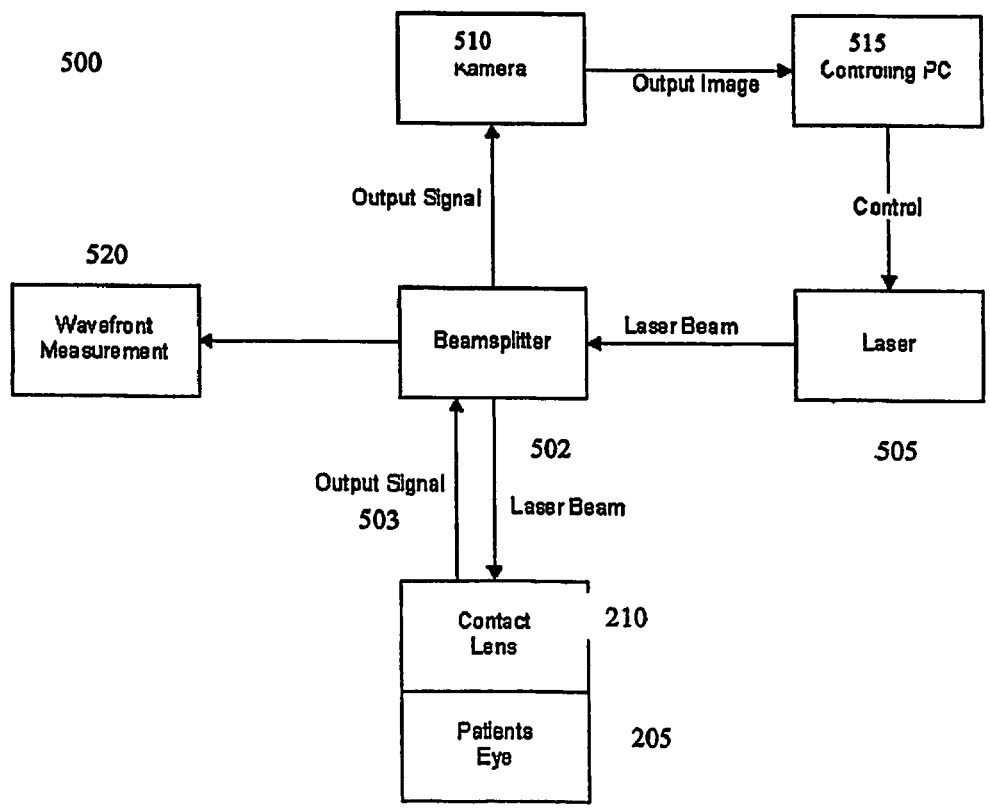
FIG. 5 is a block diagram of an apparatus embodiment according to the invention.
Figure 21:
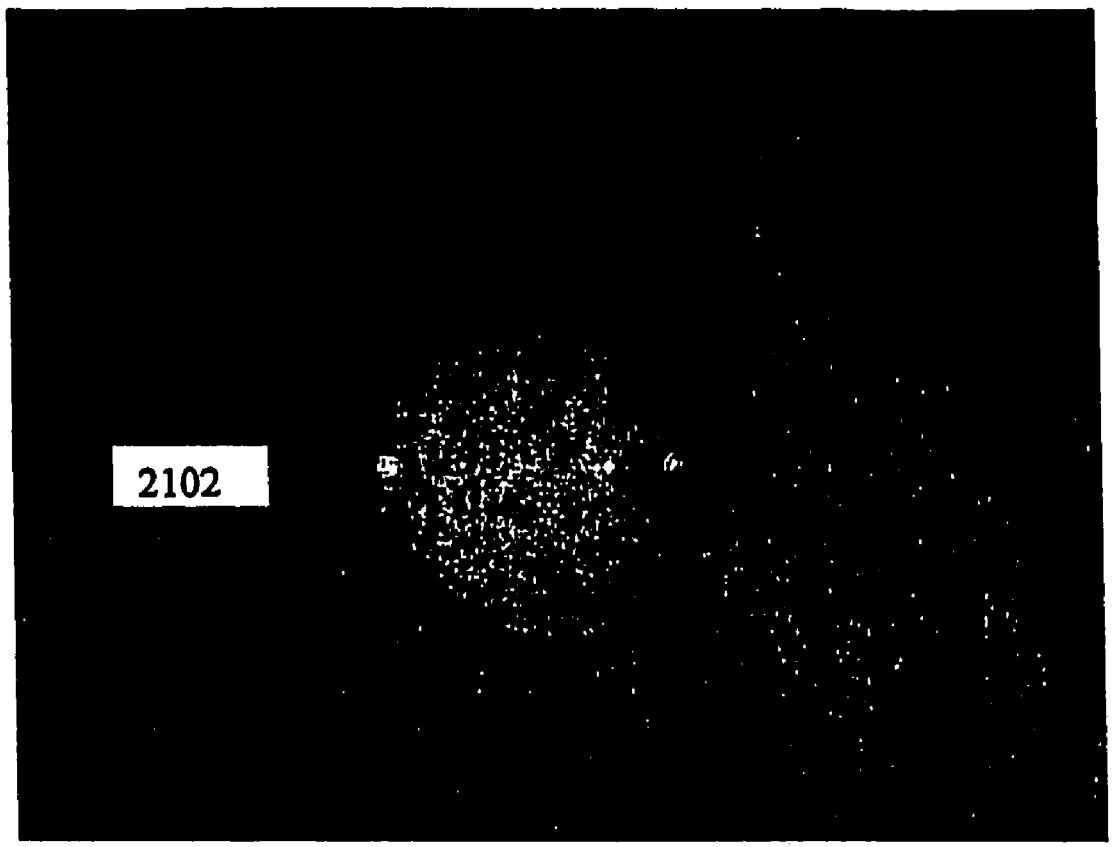
FIG. 21 is a photographic image of an in-vivo contact lens according to an embodiment of the invention.

Another embodiment of the invention is directed to a method for objectively evaluating a contact lens in-vivo, in an online manner. The steps of a method embodiment 100 for objectively evaluating a contact lens in-vivo, online, are set forth in the block diagram of FIG. 1. According to this illustrative embodiment, the contact lens is lens 215 described above with reference to FIGS. 2, 18, 19 and 20. An alternative aspect of this embodiment for the specially marked lens 3302 shown in FIG. 33 will be described below. It is to be appreciated that, as mentioned above, the entire process set forth below in reference to FIG. 1 requires approximately 40 ms per image based upon the algorithm used (which will be discussed in detail below), then occurs again for a next image, and so on, for the desired time interval. Data, but not images, is stored as will be explained in more detail below, thus the data storage requirement and the algorithm itself will influence the permissible time interval for image acquisition. At step 105 a patient is fitted with a specially marked contact lens such as described above. This is illustrated again with reference to FIG. 2, which schematically shows a front view of a subject's eye 205 fitted with an exemplary embodiment of a specially marked contact lens 210. The subject is positioned with respect to an aberrometer/wavefront sensor 520 as illustrated in the system diagram 500 of FIG. 5. The apparatus 500 generally comprises an illumination source 505 such as a laser for illuminating the patient's eye and the contact lens 210, a pupil camera 510 for obtaining an image of the patient's eye operably connected to the laser through a control system 515, and a wavefront sensor component 520 for detecting and analyzing centroid images. The subject's eye 205 is illuminated by measurement light 502 at step 110 such that the light scattered from the subject's retina floods the pupil and illuminates the lens marks 215 with the outgoing light. At step 115 of FIG. 1, the light 503 exiting the eye is detected and imaged by a CCD-camera component of the wavefront sensor 520 so that the illuminated lens marks are suitably resolved, as illustrated by the photographic copy 2102 in FIG. 21. At some point, noted by step 120, position/diameter coordinates of the subject's pupil are determined. These coordinates could include the pupil center, for example, and may further include pupil orientation, pupil diameter, or other selected pupil parameters. A detailed example of pupil parameter determination will be set forth below. At step 125, a center of mass determination is made for each of the imaged lens marks to determine mark position coordinates. Once the lens mark coordinates are known, the position and orientation of the contact lens with respect to the measured pupil parameter can readily be deduced as set forth at step 130. According to the embodiment just described, the crosses 1804 shown in FIG. 19 act as reference markings on the lens, which aid in determining the position and orientation of the lens in-vivo. The pupil center, for example, can always be established in reference to the lens marks 1804. Typically, the marks 1804 are standard markings outside of the optical zone of the lens and are not to be confused with the special markings 215 described herein.

Figure 17:
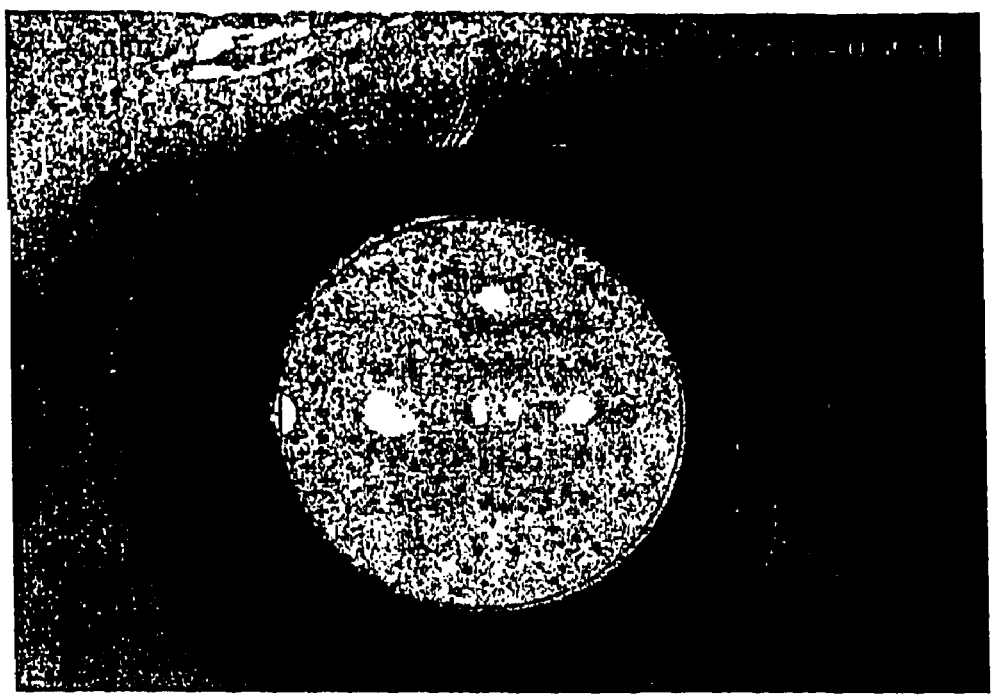
FIG. 17 is a photographic image of an algorithm evaluation of a contact lens according to an embodiment of the invention.

In an exemplary embodiment, step 130 is carried out using a modified Hough transform. This technique provides a fault-tolerant method for fast calculation of the position and orientation of both rotationally and non-rotationally symmetric line patterns such as the illustrative lens marks described above, even in a noisy environment. Both classical Hough transform and generalized Hough transform techniques are well known by those skilled in the art, therefore a detailed description is not necessary for an understanding of the invention. The interested reader is referred to the Internet address http://cs-alb-pc3.massey.ac.nz/notes/59318/l11.html for an exemplary description. In general, according to an illustrative embodiment of the invention, the lens marks are arranged in lines. The angles between these lines are known. A Hough transform is done for all points. Angular accumulations connecting at least two points are found in the Hough transform. The angular distances of these accumulation areas are correlated with the angles of the known lines in the structure. This gives a first approximation on the angle. Hough-back-transformation of the points in these accumulation areas which satisfy the given angle relation allows a clear allocation of the points to the lines. Points that do not lie on these lines are discriminated. This works even for the case that only points building two of the lines are given. For test purposes, a correlation with the angles of a flipped structure can also be built. If the correlation is higher than in the first case, an indication for a flipped contact lens is found. The rotation of the whole structure is determined from the average angles of the lines. The shifts are determined with the crossing points of the lines. It is possible to run the algorithm with a low angular resolution and to pre-calculate parts of the Hough transform. This ensures short calculation times of a few milliseconds. An example for the detected pupil and marks is shown by the photographic copy in FIG. 17. All marks have been found by the algorithm. The additional points, which do not belong to the marks, in general, are not well defined (for each dot the algorithm gives a quality factor which is low for these dots) and can therefore be excluded in most cases. It is also possible to exclude those points that do not fit into the predefined structure.

An alternative aspect of this embodiment is described with reference to FIGS. 33 and 34. FIG. 33 shows an in-vivo contact lens 3302 with a blue mark 3304 in the upper part of the image (shown by the arrow). In this illustrative examples, the color of the iris is blue and is very similar to the color of the mark 3304; however it is possible to clearly detect the mark by using an appropriate filter. The filter can be applied in the following way: The color of every pixel is defined by an RGB-value, i.e. 3 bytes for every color red, green and blue. All three colors are restricted to a certain range, which is most characteristic for the mark color. In the instant example, the filter had the following restrictions:

a) Ratio of red intensity to blue intensity is smaller than 0.6;

b) Ratio of blue intensity to green intensity is smaller than 1.4; and c) Ratio of blue intensity to green intensity is larger than 1.0.

Figure 34:
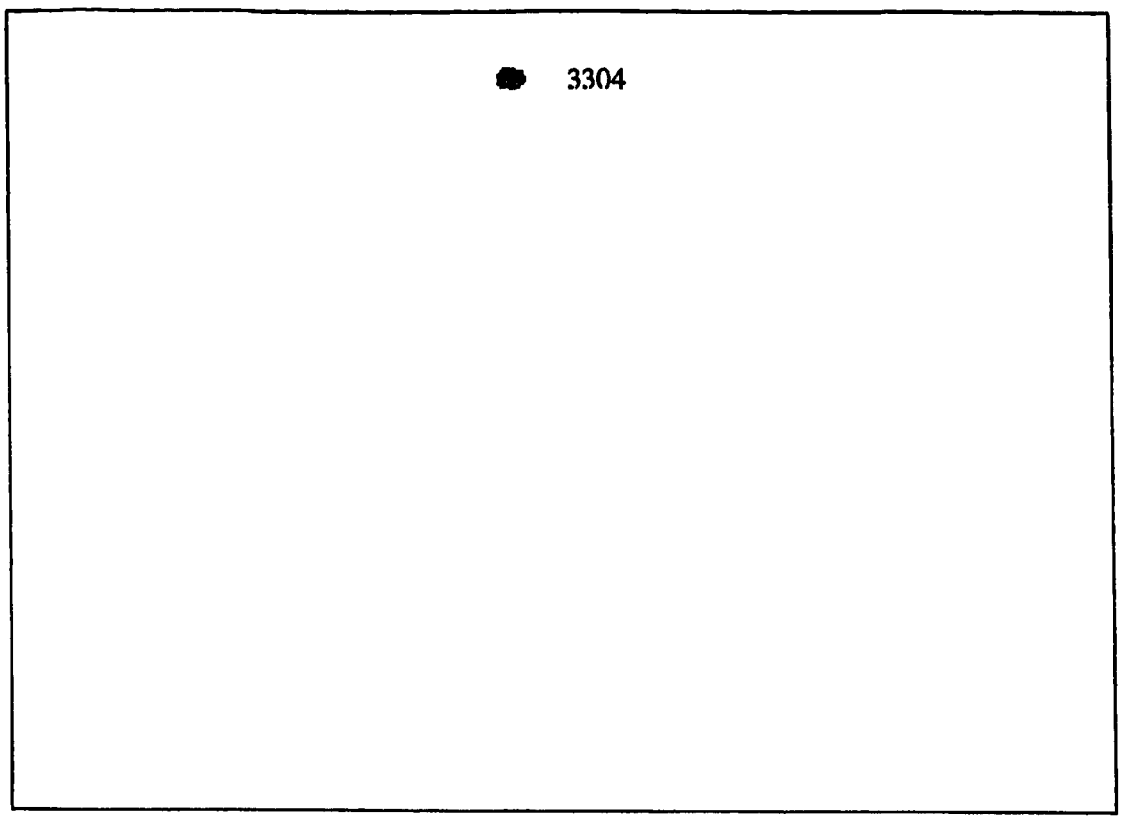
FIG. 34 is the image in FIG. 33 after color filtering for mark detection according to an embodiment of the invention.

FIG. 34 shows the filtered image of FIG. 33 where colored dot 3304 is clearly detectable. Some pupil glint artifacts can also be seen in the figure. Any other restrictions for the color could be chosen that would be helpful for finding the regions for the right color. A mark pattern consisting of at least three different marks, without rotational symmetry, is sufficient for determining contact lens position and orientation (including lens inversion) in-vivo. After filtering, the desired structure can be compared with the measured pattern to determine the position and orientation of the contact lens according to a variety of software techniques well known to those skilled in the art.

Figure 1:
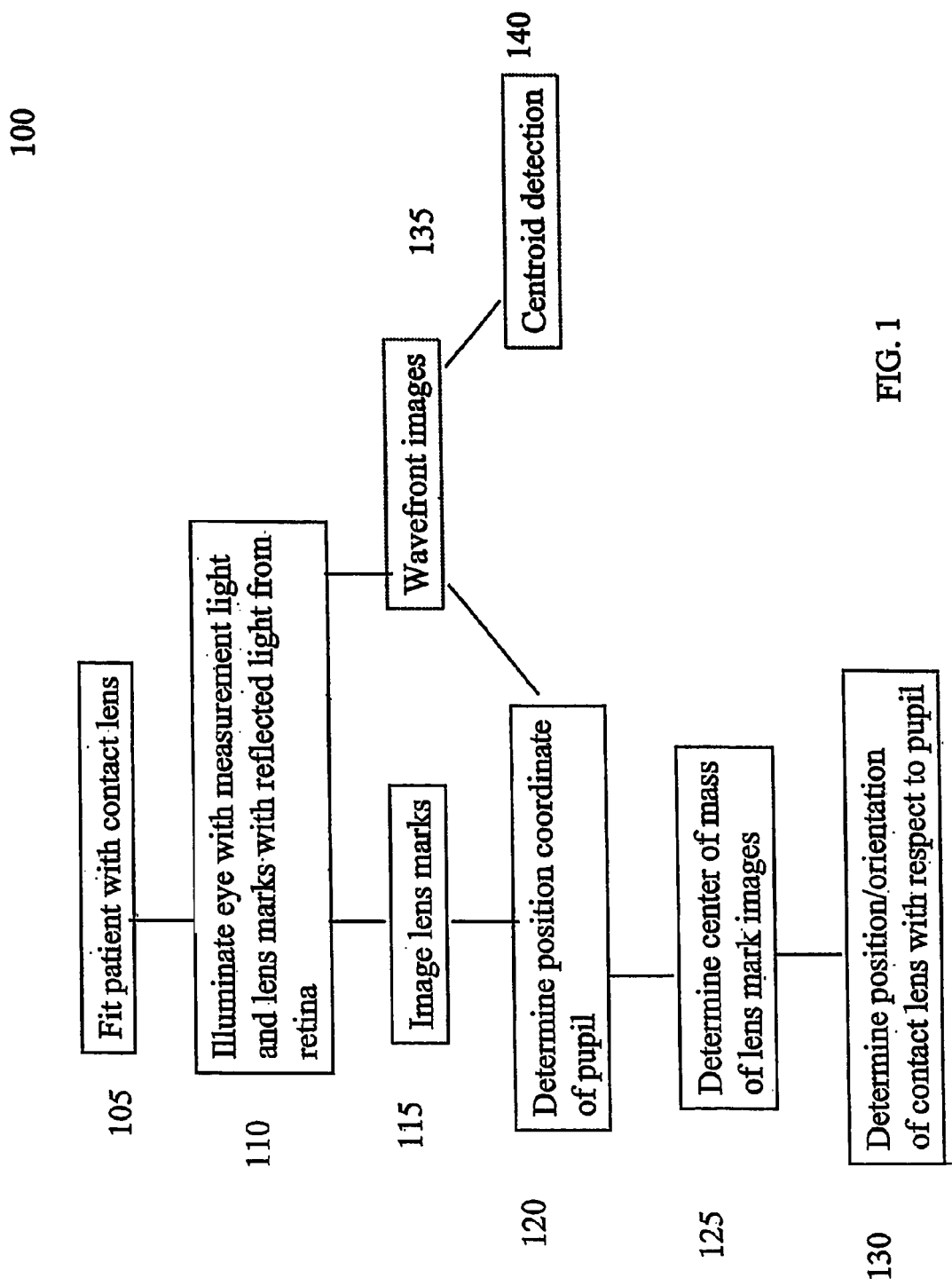
FIG. 1 is a block diagram setting forth a method embodiment of the invention.
Figure 2:
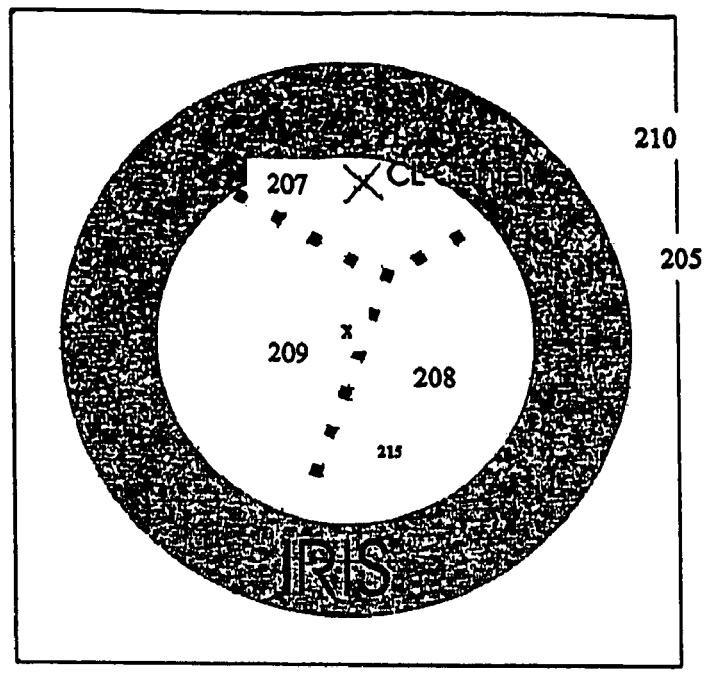
FIG. 2 is a schematic front view of an in-vivo contact lens according to an embodiment of the invention.

In an aspect of these embodiments, a plurality of wavefront images in correspondence with the contact lens images can also be obtained online as shown at step 135 in FIG. 1. In an exemplary embodiment, a Hartmann-Shack wavefront sensor is used to obtain second-order through sixth-order Zernike amplitudes, although up to $9^{th}$ order can be obtained if desired based upon lenslet parameters. Wavefront sensing techniques other than the Hartmann-Shack principle are widely known and can also be used. For example, wavefront sensing based on the Tscherning principle can be used, among others. Commercially available wavefront sensors are typically provided with software algorithms that facilitate wavefront measurement and analysis.

Figure 4:
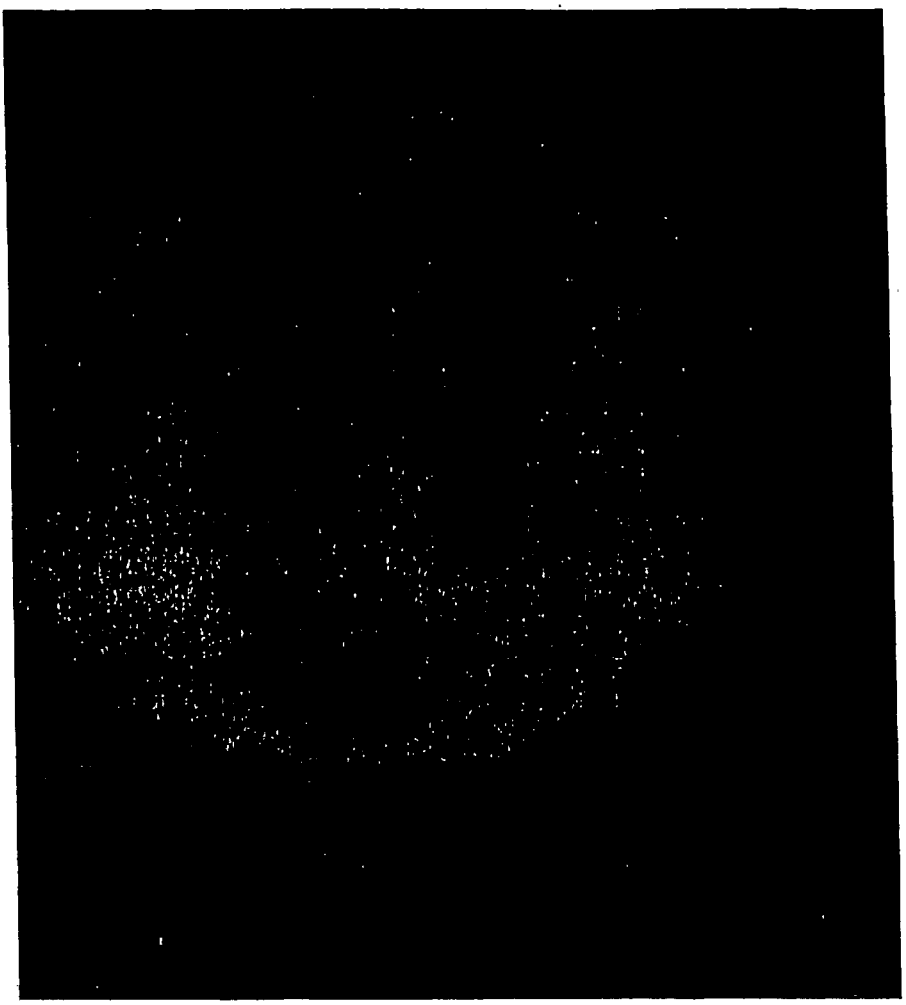
FIG. 4 is a photographic copy of a Hartmann-Shack wavefront image obtained in accordance with an embodiment of the invention.

In order to make online wavefront measurements and analyses in the context of the instant description, a very fast algorithm is employed as described in the co-pending application referred to above, and described in detail below. Those skilled in the art will appreciate, however, that various algorithms can be constructed for centroid analysis. A method for online centroid detection in a wavefront image as set forth at step 140 in FIG. 1 according to the instant embodiment is further described with reference to the flow chart diagram 300 of FIG. 3. In the illustrated embodiment, a sequential plurality of images are acquired, analyzed, and displayed at a rate of 25 hz, but for the sake of simplicity the algorithm steps set forth below apply to a single wavefront image and are repeated for every wavefront image. At step 302, an X×Y pixel size wavefront image is acquired, as shown for example by image 42 in FIG. 4. The light spot images are represented by variable pixel signal intensities as shown. Images taken from a CCD camera usually consist of an array of pixels in which every pixel is assigned a number proportional to the amount of charge collected at this pixel. This number is referred to as the signal of the pixel. In the illustrative description that follows, a regular square grid of bright points in a dark image will be described in detail.

i) Image Compression

After acquiring the image at step 302, the image is compressed from size X×Y pixels to X/n×Y/m pixels at step 304. This can be done by averaging the signal for every pixel in an n×m pixel square in the original image starting, for example, in the upper left corner 606 (FIG. 6) of the image and scanning through the image. The signal in the upper left corner of the compressed image is then set to the average of the first square, the signal of the next pixel is set to the average of the next (second) square, and so on, finally yielding a picture X/n× Y/m pixels in size. n and m should be integers with X/n and Y/m also being integer values. In an exemplary embodiment, n=m=8.

ii) Background Subtraction

At step 306, the compressed image is then divided into square regions, or tiles (not to be confused with the pixel squares in (i) above). In the exemplary embodiment, one tile is a square of 64×64 pixels, but other sizes can be used. Typically, one tile might contain 3-5 centroids. The average signal is again calculated for every tile. The average values for the tiles are then linearly extrapolated to yield a background value for any location in the image. This background is then subtracted from the image yielding a low signal outside the centroids. In the illustrative embodiment, a signal-to-noise ratio of two was improved to a signal-to-noise ratio of 10 by the background subtraction.

iii) Rough Structure Detection

At step 308, the appoximate, or rough, structure points (centroids) are identified. First, a maximum is defined as the highest signal in the compressed image. The maximum is determined by a scan through the image, and the X-position, Y-position, and signal value of every pixel is recorded in a table, but only if the signal value of this point is greater than a certain percentage of the maximum, e.g., 30% (other values can be selected by the user). In the exemplary embodiment, this yields a list of about 400 entries as shown in Table I. The list is sorted by descending signal as shown. Any of a variety of known quick sorting routines is available to accomplish this.

TABLE I

| Signal | X Position | Y Position |
|--------|------------|------------|
| 223 | 86 | 55 |
| 154 | 85 | 75 |
| 135 | 87 | 95 |
| 133 | 115 | 56 |
| 110 | 118 | 74 |
| 108 | 114 | 93 |
| . | . | . |
| . | . | . |
| . | . | . |

The first entry (highest signal value) is defined as the first rough structure point. Then, all entries in the list that obey a certain pre-set condition are defined as rough structure points. In the exemplary embodiment, the pre-set condition is that the position of the particular entry is farther away from all yet found rough structure points than a pre-set distance. In an exemplary embodiment, the distance is 17 pixels. After this first iteration, a table of rough structure points is created that includes approximately 95% of all points that are to be detected.

iv) Refine Detection of Structure

To increases the confidence level that all points of the structure are found, step 308 can be repeated as shown at block 310, setting a new minimum to a certain percentage of the minimum in the first iteration. The second iteration finds points that were too weak in signal to be found in the first iteration. The rough structure points found in the first iteration are accounted for so they will not be found again (i.e., they do not obey the condition of being farther away than a pre-set distance from the detected points).

v) Ultimate Structure Detection

At step 312, the ultimate centroid positions are determined. Since the image was earlier compressed in step 304, much of the information originally contained in the image was ignored. This information can now be used to determine more exact centroid positions. Using the original uncompressed image, a square of, for example, 15×15 pixels is created around every rough point. Generally, each square is smaller than 2× the minimum distance to insure that each square contains only one centroid, and is larger than the centroid itself. In the exemplary embodiment this value is between five and 30 pixels. Then, the center of mass of signal for the signal distribution inside the square is determined, giving rise to the substantially exact position of the centroid.

In an aspect of the embodiment, step 312 can be repeated, for example, 1, 2, 3 ... n times to determine still more exact results. The calculated center of mass in the previous step is subsequently used. Each structure point can also be assigned a quality factor depending on how much the position of the center of mass changes if the square around the pixel is willingly shifted by a user-set distance, at step 312. In an exemplary embodiment, this distance is five pixels. The points whose positions have changed the least are assigned the highest quality factors. In this manner, spurious points or noise assigned a low quality factor can be eliminated, as they likely represent false structure points.

Figure 7:
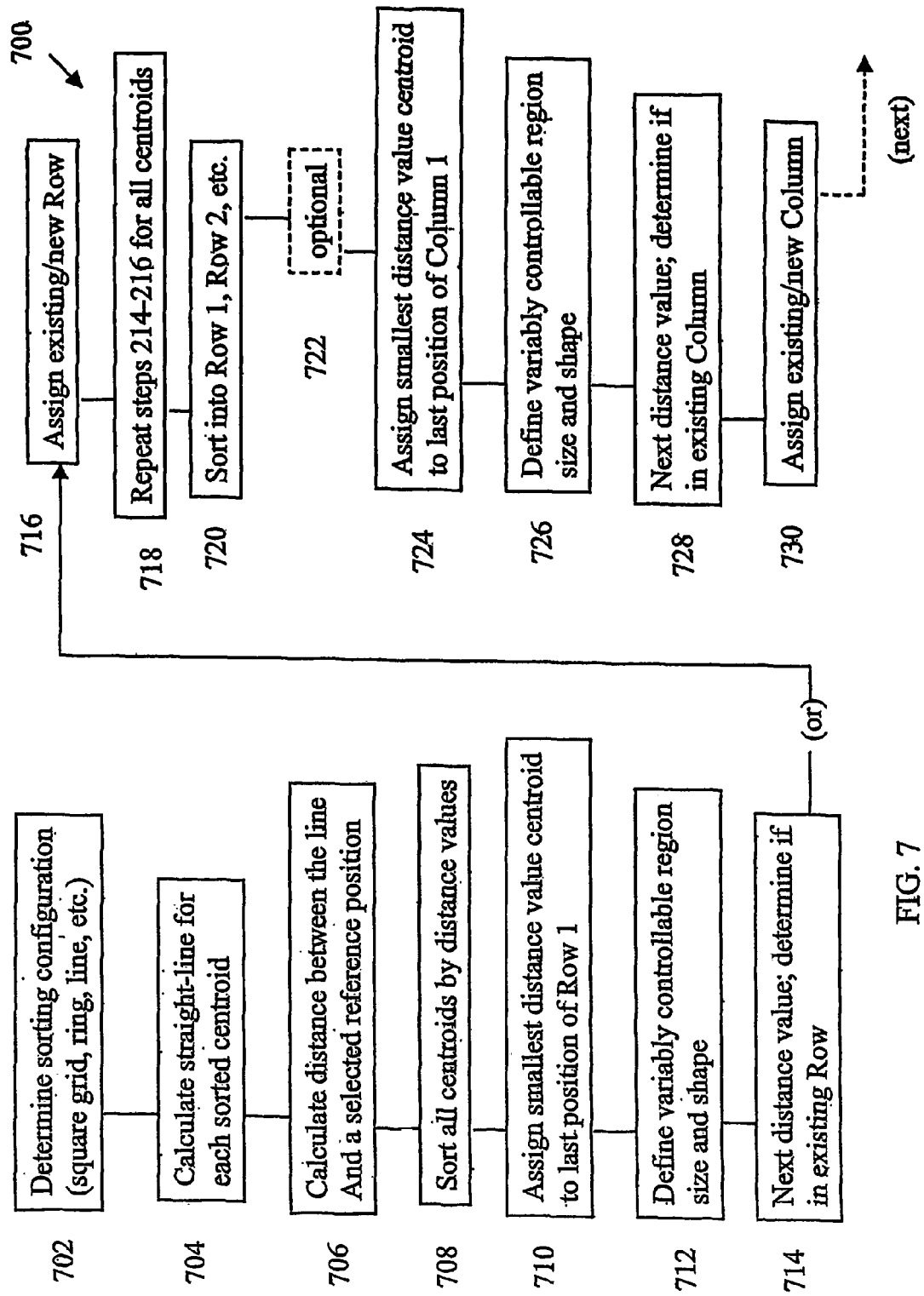
FIG. 7 is a block diagram of a fast centroiding algorithm according to an embodiment of the invention.

In the illustrative embodiment directed to Hartmann-Shack wavefront sensing, it is desirable to be able to correlate the centroids with the corresponding image forming lenslet of the microlens array. Thus, an aspect 700 of the embodiment as illustrated in FIG. 7 is directed to the process of sorting the detected centroids so as to assign them to a regular square grid pattern. It will be appreciated by those skilled in the art that the algorithm can be easily adapted to other structures or configurations such as, for example, points on rings, or any straight line of points.

Figure 6:
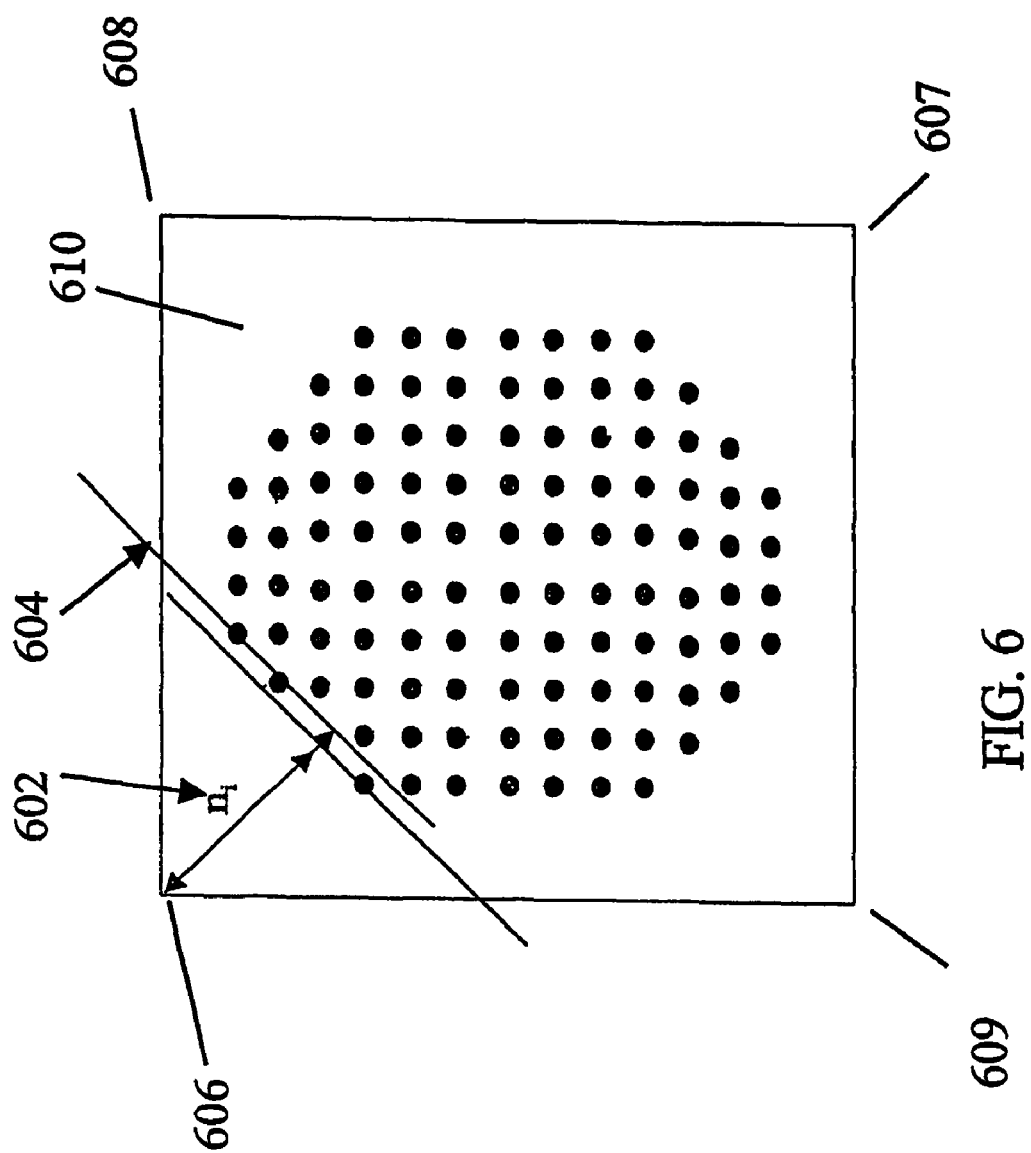
FIG. 6 is an illustrative drawing of Hartmann-Shack centroid images according to an embodiment of the invention.
Figure 8:
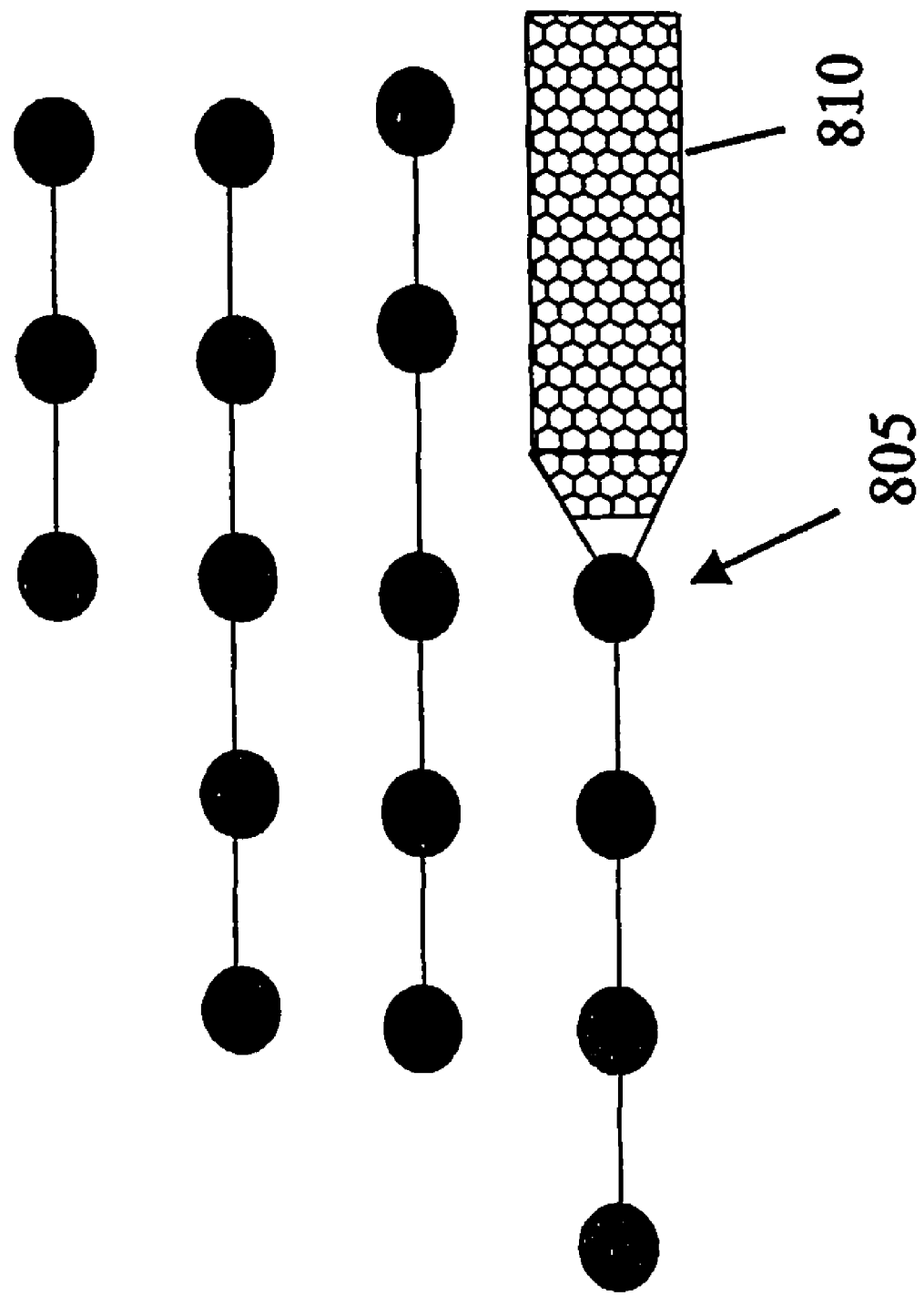
FIG. 8 is an illustrative diagram of rows and columns of centroid images in accordance with an algorithm embodiment of the invention.
Figure 9:
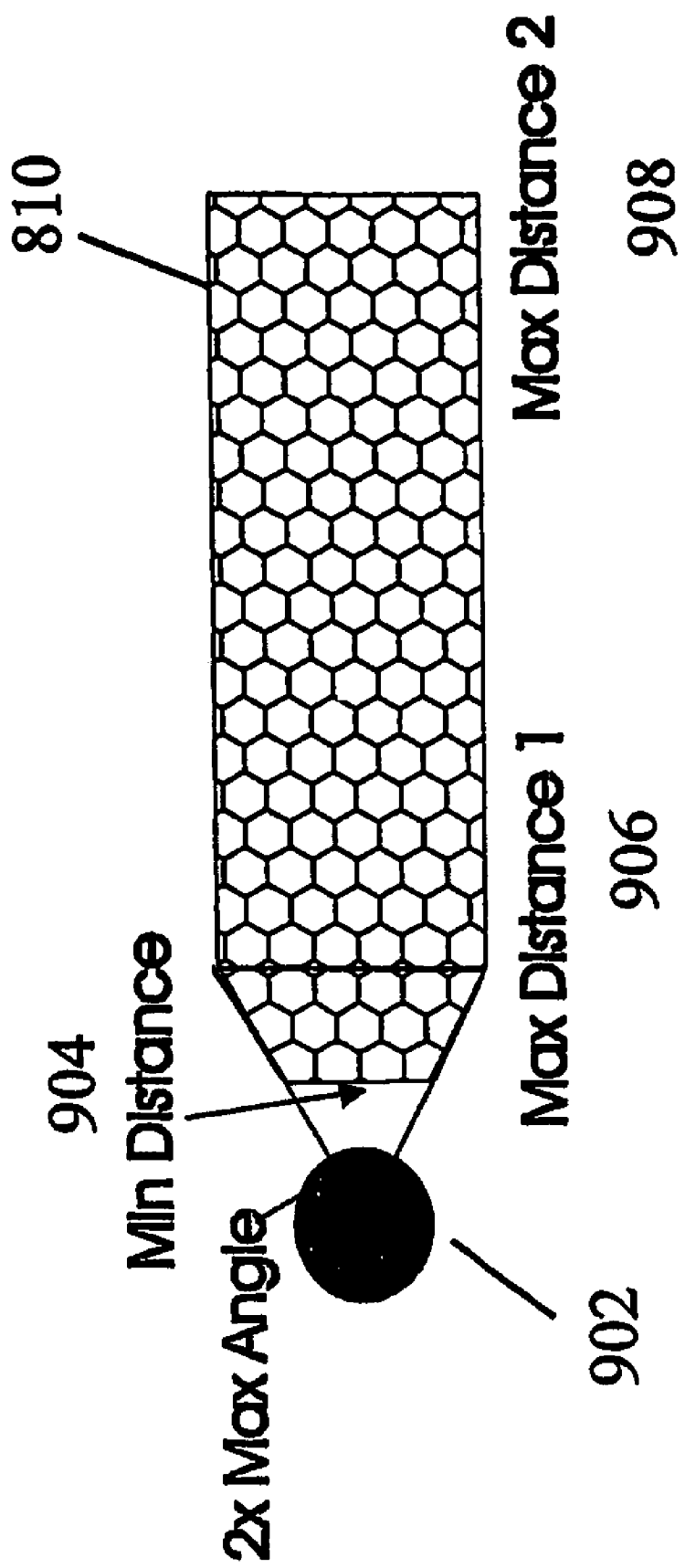
FIG. 9 is an illustrative diagram in accordance with a fast centroiding algorithm embodiment of the invention.

At step 702, the desired sorting configuration is selected. In the exemplary embodiment, the configuration is a square grid based upon the geometry of the microlens array. For every previously found centroid point, i, the formula for a straight line 604 is calculated containing the centroid point, i, and having a slope of 1 (45°), as shown at step 704. For starting positions of the upper left corner 606 or lower right corner 607 of the image (as shown in FIG. 6), slope values between 0.1 to 0.9 can be used. Likewise, when the starting position is the upper right corner 608 or the lower left corner 609 of the image, slope values from −0.1 to −0.9 can be selected. At step 706, the distance $n_i$ (602, FIG. 6), between the line 604 and, in the illustrative embodiment, the upper left corner 606 of the image 610 is calculated, as illustrated in FIG. 6. All centroids, i, are then sorted by $n_i$ at step 708 starting with the centroid having the smallest $n_i$ value. At step 710, the centroid with the smallest $n_i$ value is assigned to Row 1 and is stored in memory as the last centroid of Row 1. In an aspect of the embodiment, the last centroids of the existing rows are stored in memory during step 710. At step 712, a region 810 (FIG. 8) is defined that, in an exemplary embodiment, comprises an area to the right of the last centroid 805 of a given row, having dimensions that can be controlled and varied to adjust for different lenslet arrays, and having a shape that is suited to detecting the selected grid configuration, as illustrated in FIG. 8, which shows the search area 810 for the next centroid. Any shape suited for detecting other grid configurations is alternatively possible. Examples of the lenslet array parameters include maximum angle 902, minimum distance 904, maximum distance 1 (906), and maximum distance 2 (908), as illustrated in FIG. 9. Then, at step 714, the next higher $n_i$ value is selected and that centroid is checked, with respect to all existing rows, whether the centroid is in the defined region. If yes, then at step 716, that centroid is assigned as the last centroid of that row. If no, than that centroid is assigned the last centroid of a new row. Steps 714-716 are now repeated for all centroids. In this manner, rows start to build up from left to right. At step 720, the average y-position for each row is calculated and the rows are sorted according to their average y-position. This step facilitates marking of the top row as Row 1, the next row as Row 2, and so on.

Figure 10:
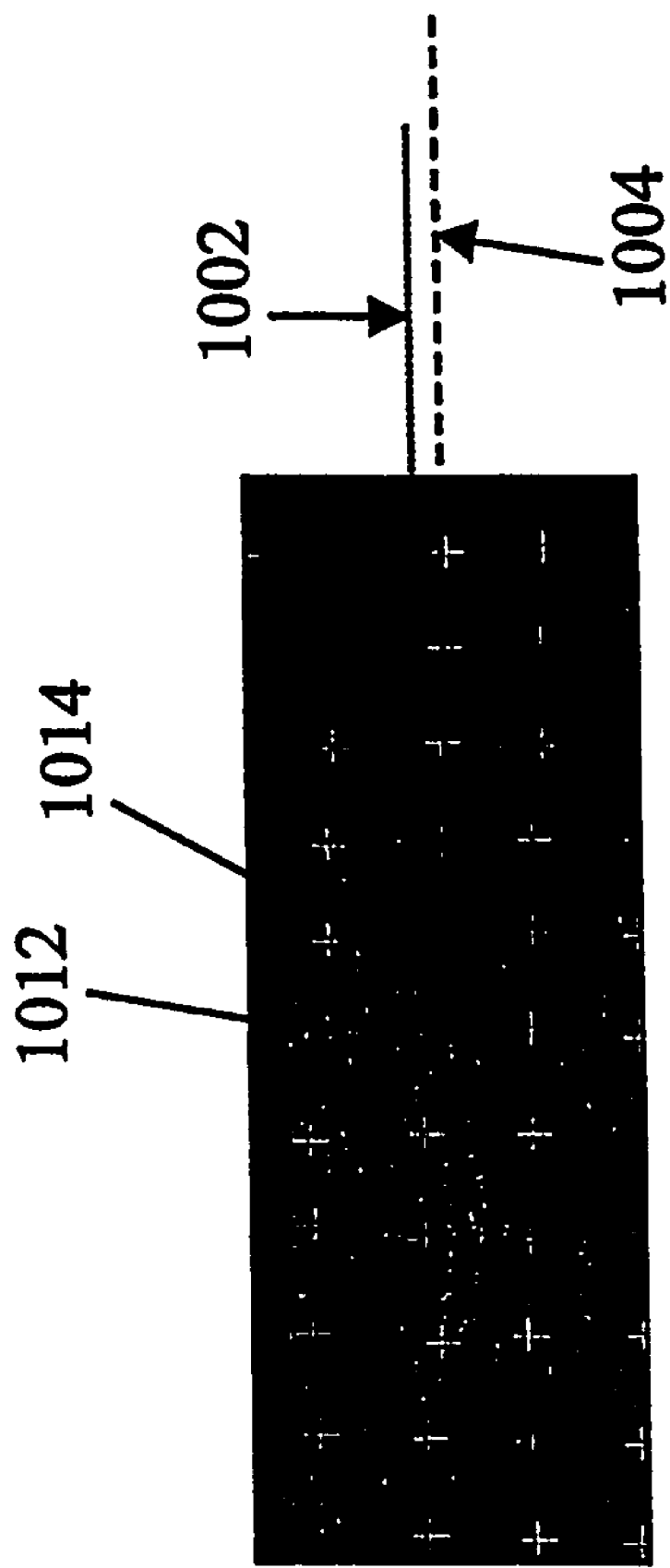
FIG. 10 is a photographic copy of Hartmann-Shack centroid images in accordance with a fast centroiding algorithm embodiment of the invention.

Before describing the steps for sorting the columns, it is beneficial to point out that the situation can occur as illustrated by the faintly seen points lying along lines 1002, 1004 as shown in FIG. 10; i.e., some centroids 1012, 1014 in the middle of a row have not been detected due to bad quality of the centroid points, and the centroids to the left and right have been assigned to different rows. In this event, optional step 722 involves merging these rows. This is accomplished by the following sub-steps: From the mean average y-position for each row from step 714, calculate the mean distance between the rows by subtracting $y_{row1}-y_{row2}$ (yielding the distance between Row1 and Row2); $y_{row2}-y_{row3}$ (yielding the distance between Row2 and Row3); and so on, and then taking the mean values of the obtained distances. In the exemplary embodiment, the criteria for merging rows j and k is: If $y_j-y_k<f*a$ and $(P_{k,first}>P_{j,last}$ or $P_{k,last}<P_{j,first})$, where:

f is a variable parameter in the range between about 0.1-0.7 that is set by the user. In the exemplary embodiment, values between 0.3 to 0.5 are used;

a is the mean distance between rows (see above);

$P_{k,first}$ is the x value of the first (left-most) centroid of the k row; and $P_{k,last}$ is the x value of the last (right-most) centroid of the k row.

In other words, the rows are merged if they are much closer in the y-position than typical and if they don't overlap i.e. row j is either completely to the left or completely to the right of row k.

The process for sorting the columns begins at step 724 where the list of sorted centroids by distance value from step 708 is used again. The centroid with the smallest $n_i$ is assigned to Column 1 and is stored in memory as the last centroid of Column 1. In an exemplary aspect, the last centroids of an existing column are always stored in memory during step 724. At step 726, a region is defined that, in the exemplary embodiment, comprises an area below the last centroid of a given column having dimensions and shape that are controlled and varied by the same parameters of the lenslet array as set forth above. This is illustrated by tilting the diagram in FIG. 8 downward by 90 degrees. At step 728, the next higher $n_i$ value is selected and that centroid is checked, with respect to all existing columns, whether the centroid is in the defined region. If yes, then at step 730, that centroid is assigned as the last centroid of that column. If no, than that centroid is assigned the last centroid of a new column. Steps 728-730 are now repeated for all centroids. In this manner, columns start to build up from top to bottom. At step 734, the average x-position for each column is calculated and the columns are sorted according to their average x-position. This step facilitates marking of the left-most column as Column 1, the next column as Column 2, and so on.

The situation can occur, as mentioned above with reference to FIG. 10, where some centroids in the middle of a column have not been detected due to bad quality of the centroid points, and thus the centroids above and below have been assigned to different columns. In this event, optional step 736 involves merging these columns. This is accomplished by the following sub-steps: From the mean average x-position for each column from step 728, calculate the mean distance between the columns by subtracting $x_{column1} - x_{column2}$ (yielding the distance between Column1 and Column2); $x_{column2} - x_{column3}$ (yielding the distance between Column2 and Column3); and so on, and then taking the mean values of the obtained distances. In the exemplary embodiment, the criteria for merging columns j and k is: If $x_j - x_k < f^*a$ and ($P_{k,first} > P_{j,last}$ or $P_{k,last} < P_{j,first}$), where:

f is a variable parameter in the range between about 0.1-0.7 that is set by the user. In the exemplary embodiment, values between 0.3 to 0.5 are used;

a is the mean distance between columns;

$P_{k,first}$ is the y value of the first (top-most) centroid of the k column; and $P_{k,last}$ is the y value of the last (bottom-most) centroid of the k column.

In other words, the columns are merged if they are much closer in the x-position than typical and if they do not overlap; i.e. column j is either completely above or completely below column k. From the sorted centroid positions, a Zernike calculation can be made to determine the wavefront aberration.

It is to be appreciated that the embodiment described above is not limited to the simultaneous, online measurement of wavefront aberrations only with the specially marked lenses described herein; rather, the embodiment is more generally applicable to the simultaneous, online measurement of wavefront aberrations along with any suitable contact lens position and/or orientation measuring approach.

Figure 11:
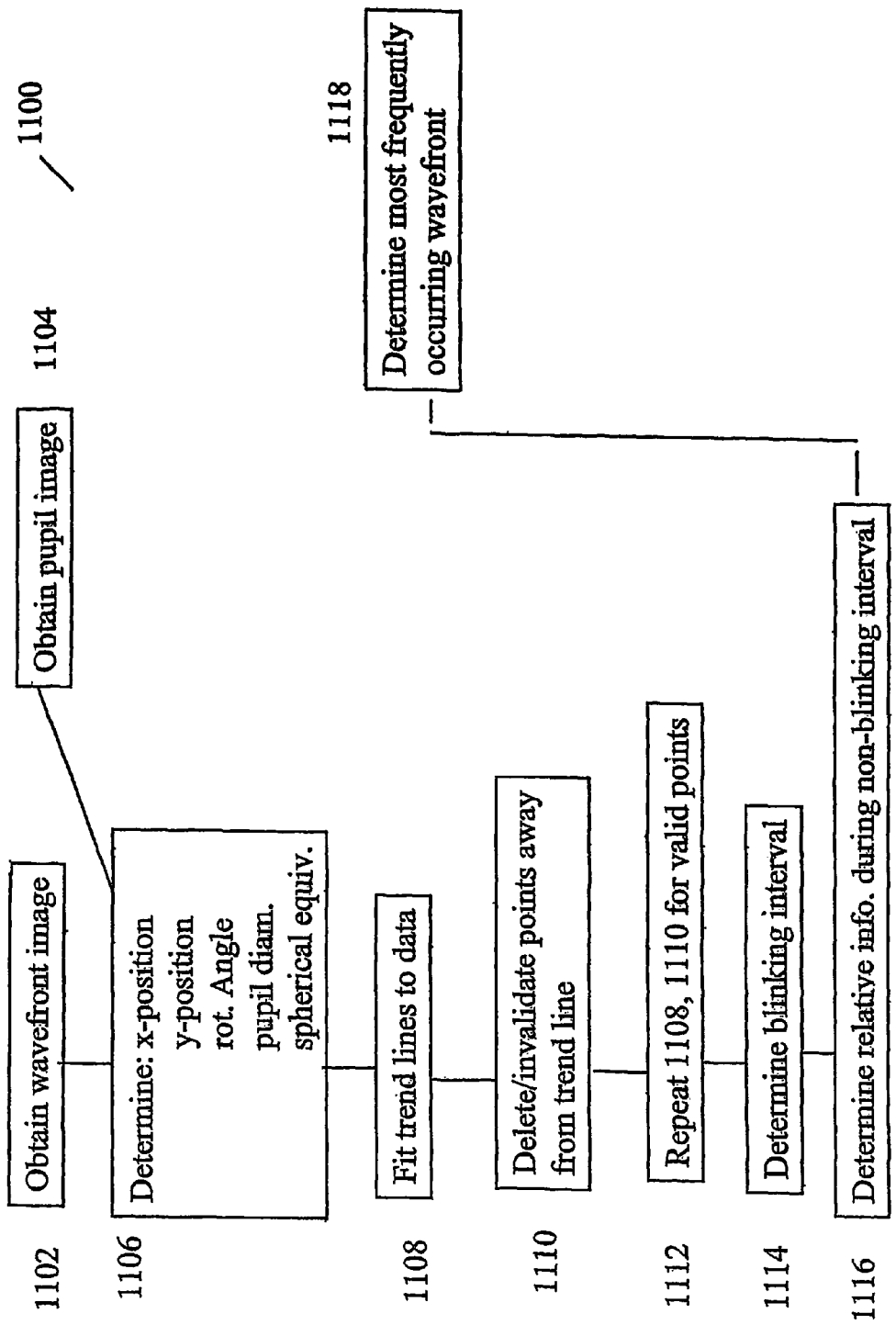
FIG. 11 is a block diagram relating to a method embodiment of the invention.
Figure 12:
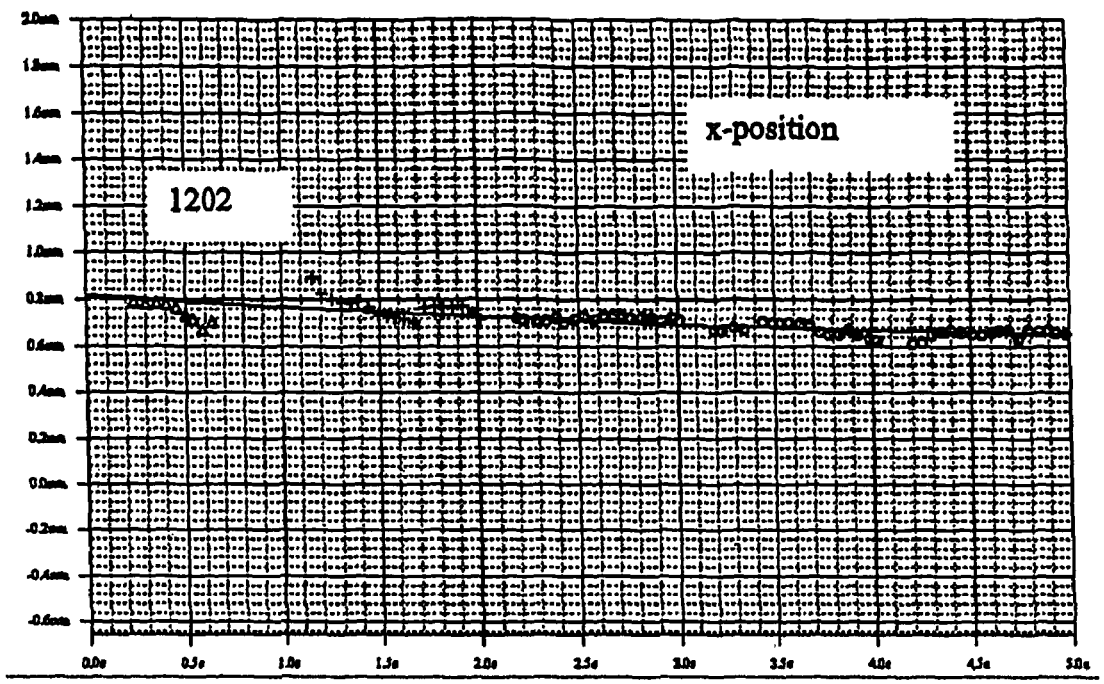
FIGS. 12-16 are plots of contact lens position coordinates, pupil parameters, and aberration measurements, respectively, as a function of time according to an embodiment of the invention.
Figure 13:
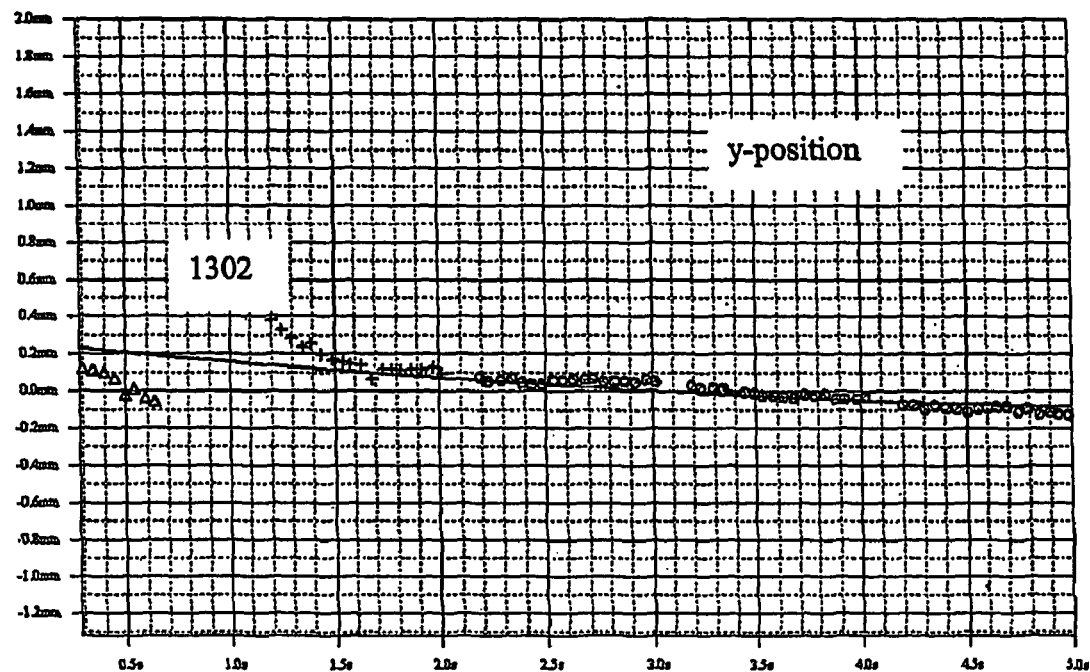
Figure 14:
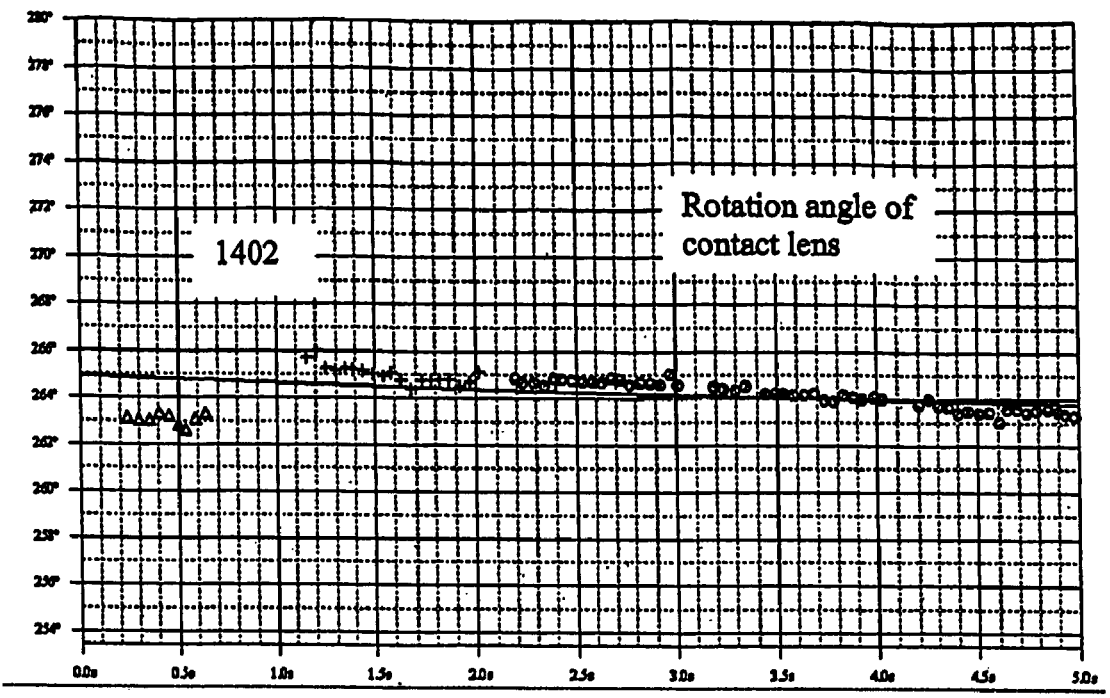
Figure 15:
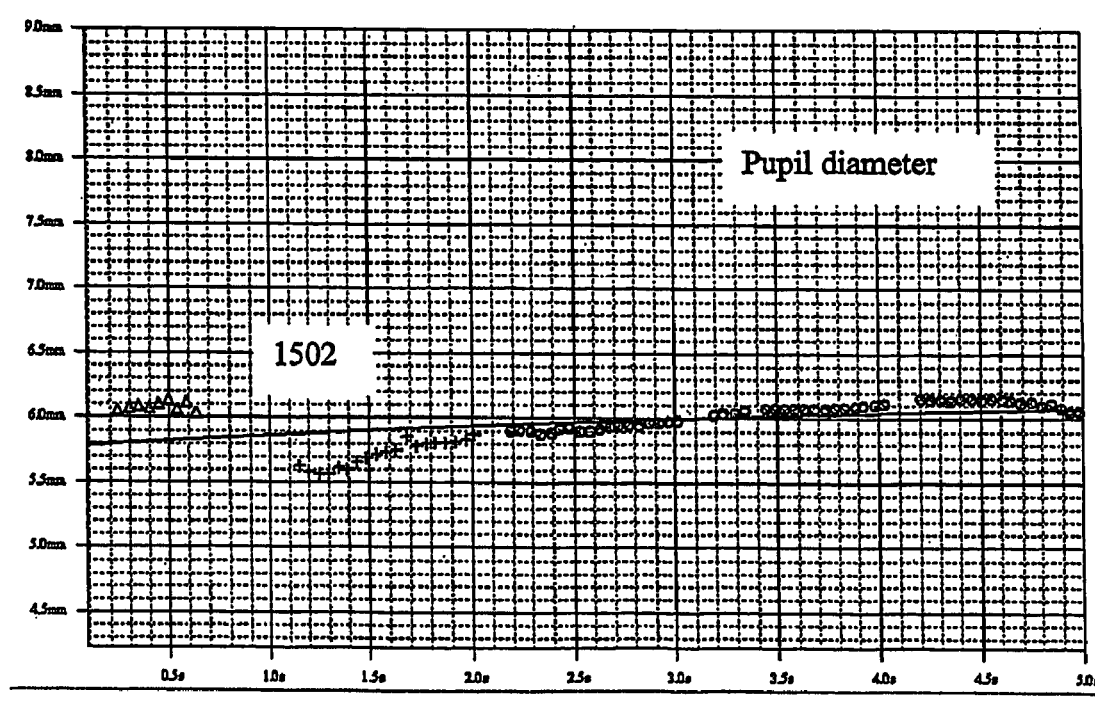
Figure 16:
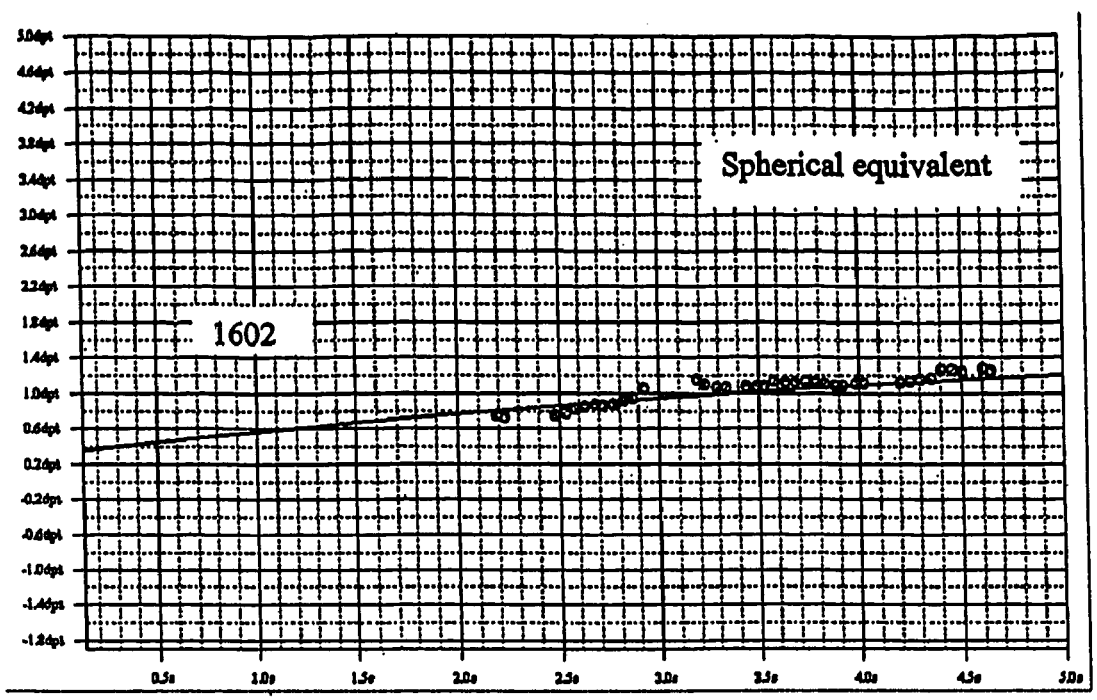

An embodiment of the invention related to the contemporaneous, online measurement of the in-vivo contact lens position/orientation and the total wavefront aberration of the subject's eye is directed to a method for determining the most frequently occurring wavefront aberration over the selected measurement interval. As mentioned above, this information is valuable in determining the best ablation profile for a customized contact lens or for making presbyopia correcting, multifocal contact lenses. In an exemplary embodiment, a measurement interval of 10 seconds is sufficient to acquire 250 simultaneous image pairs (pupil images and Hartmann-Shack lenslet images). The images are processed as set forth in the block diagram 1100 of FIG. 11 as follows: At step 1106, the x-position, y-position and rotation angle of the contact lens, the pupil diameter, wavefront data, and the refraction data are obtained from the pupil image and wavefront image in steps 1102, 1104. The x-position data, y-position data, rotation angle data, pupil diameter data, and the spherical equivalent are each plotted as a function of time as shown in FIGS. 12-16, respectively. The spherical equivalent is calculated from the wavefront data, where the maximum Zernike order is restricted to the second order. Triangle symbols in FIGS. 12-16 denote invalid measurements, cross symbols represent measurements during a blinking interval (described further below), and circle symbols represent the valid points that are used for the calculation of the most frequent wavefront. At step 1108, trend lines 1202, 1302, 1402, 1502 and 1602 are fit to the x-position, y-position, the angle, the pupil diameter and the spherical equivalent graphs. A quadratic curve was used for the fit, where the mean deviation of the measured points from the curve is a minimum. Without restriction however, any other fit can be used. At step 1110, points (shown as triangles) outside a certain range around the trend lines are deleted or marked as invalid. Exemplary ranges are ±0.1 mm for the x-position and y-position, ±3° for the rotation angle, and ±0.5 D for the spherical equivalent. Steps 1106 and 1108 can be repeated for all remaining points; i.e., valid points, at step 1112.

In an aspect of the embodiment, a blinking interval is determined at step 1114 and contact lens position information and wavefront aberration information is determined during the non-blinking intervals at step 1116. Blinking of the eye is detected when the contact lens suddenly moves away from the trend line by a certain distance. The movement generally occurs in the vertical, y-direction (upward), but can also be in other directions. As an additional indication for blinking, a sudden change of the pupil diameter can also be used. In a an exemplary aspect, blinking of the eye is detected, for example, when the y-position exceeds the trend line by a certain distance (e.g. 0.1 mm). The detection could be also combined with the measurement of the pupil diameter, i.e., if the pupil diameter rapidly decreases by a certain value, it could be taken as an indication of blinking. After the detection of a blink, all succeeding points within a certain time interval are marked as blink. In the exemplary embodiment, a time interval of 1 second was used. An exemplary blinking interval could be between about 0.3 to 2 seconds. For all pairs of images for data, which are within the trend line and not detected as blinks, the wavefront can be calculated and expressed in Zernike amplitudes. The most frequent wavefront is then calculated by taking the mean values of the Zernike amplitudes at step 1118. In the exemplary embodiment, the maximum Zernike order is 5, but it can be chosen between second to ninth order. Step 1118 can also be done for selected wavefronts, where those with the smallest and largest spherical equivalent are omitted (e.g., 7% with the smallest, and 7% with the largest spherical equivalent, are omitted). The procedure is not restricted to the use of the spherical equivalent, but can be also applied to other values such as pupil diameter, third-order Zernike amplitudes, etc. The most frequently occurring contact lens position can likewise be monitored if desired.

Figure 22:
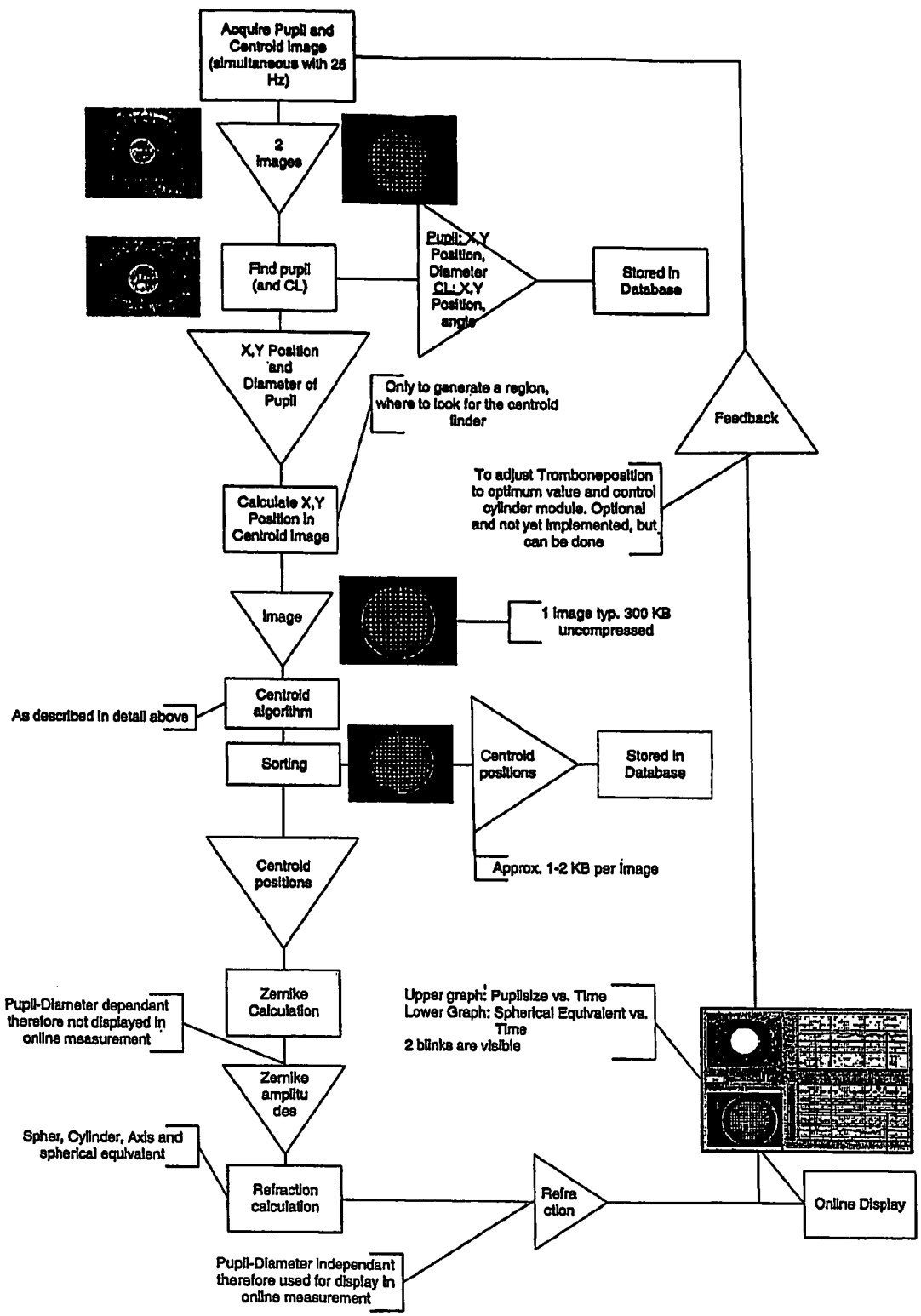
FIGS. 22-32 are a sequence of diagrams and images illustrating the determination of pupil size and position according to an exemplary embodiment of the invention, where
Figure 23:
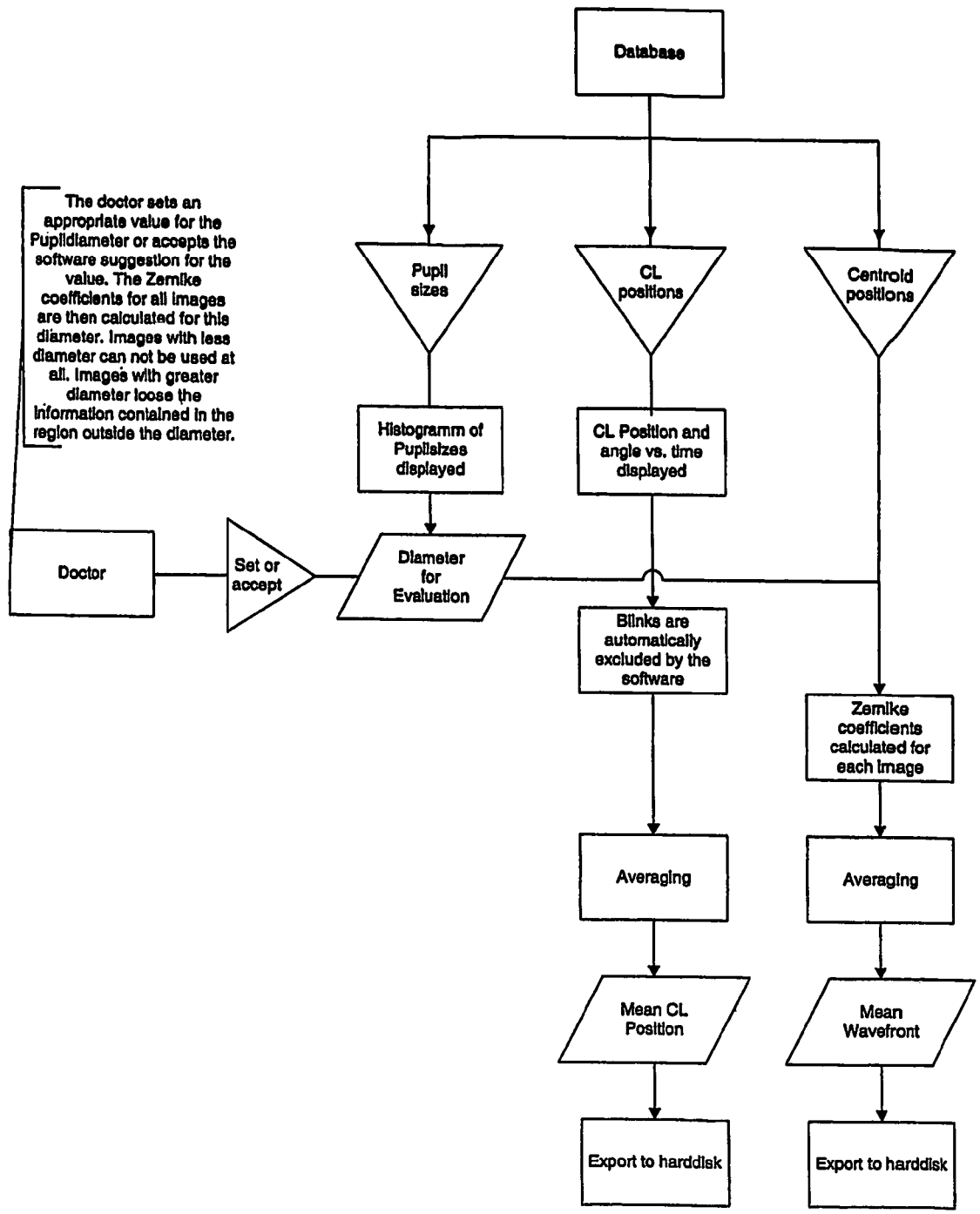

An example of pupil parameter determination is now described with reference to FIGS. 22-32. FIG. 22 shows the use of what is referred to as the pupil-finder algorithm in the online measurement FIG. 23 shows how the data is evaluated. As shown in the Figures, the complete determination of the pupil position and size, and of the contact lens position, is done during the measurement (online) and all data is shown online during the measurement. The pupil in images with half shut eyes can also be found using a lid-correction algorithm as will be described. Lid-correction can also be done online. For the correct evaluation of the contact lens position it is necessary to exclude images that have been taken when the subject blinks. As is known, contact lens position changes rapidly during blinking and will settle in the stable position in about 1 second after the blink. Therefore it is desirable to determine the blinks automatically and exclude images from the start of the blink until about 1 second thereafter. This determination of blinks is done offline in the evaluation mode of the software.

Operation of the Position Finder Algorithm

The algorithm contains the following steps:
1. Compress image
2. Calculate Threshold
3. Calculate pupil
4. Image Filtering
5. Refinement 1
6. Reflex removal
7. Refinement 2
8. Lid-correction
9. Final calculation Input: Image (see FIG. 24)

Figure 24:
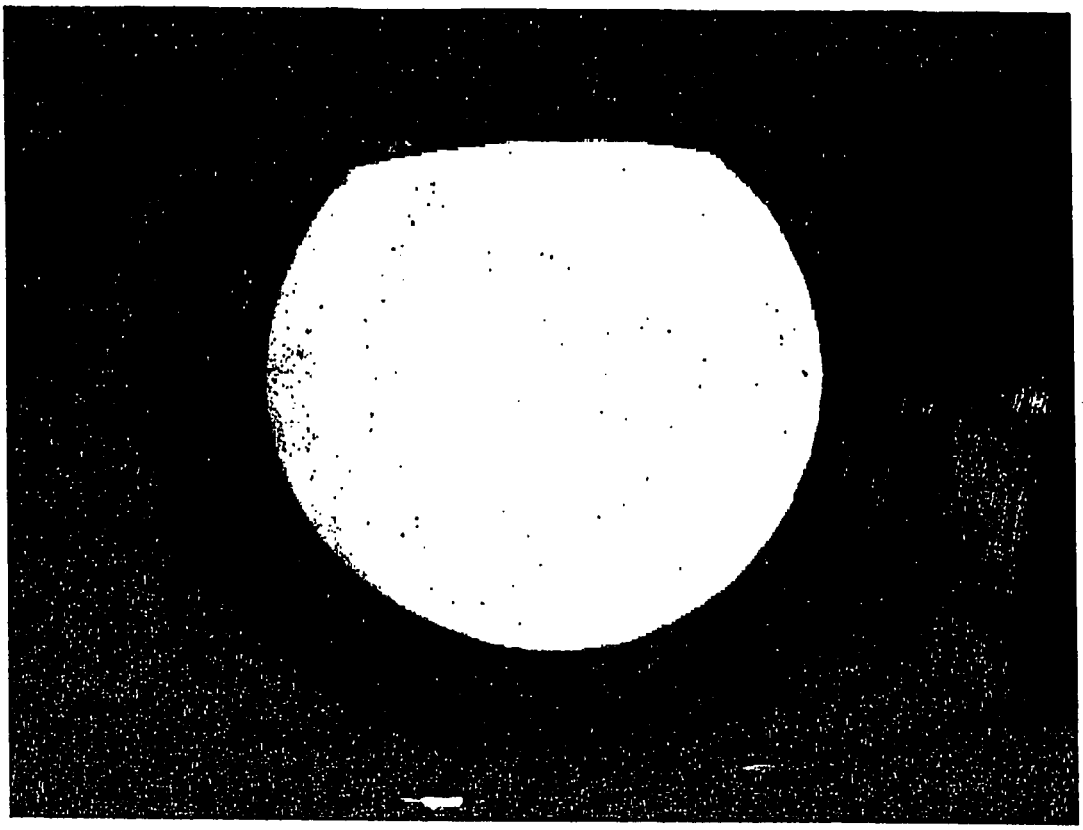
Figure 25:
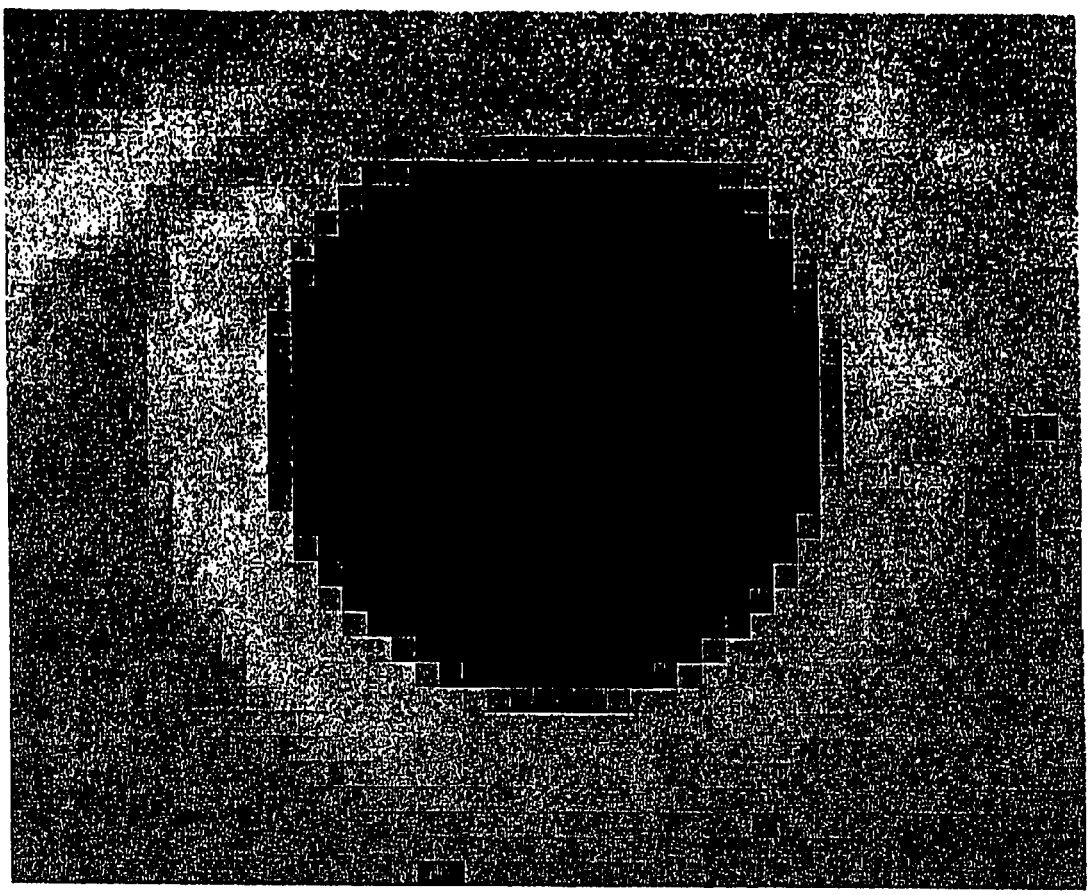

Output:
Pupil diameter in X and Y direction
Pupil position
Position and angle of contact lens 1. Compress Image The pupil image shown in FIG. 24 is compressed from size X×Y pixels to X/n×Y/n pixels. This is done by averaging the signal for every pixel in an n×n square in the original image starting in upper left corner of the image and scanning through the image, as described herein above. The signal in the upper left corner of the compressed image is then set to the average of the first square, the signal of the next pixel is set to the average of the second square and so on, finally yielding a picture X/n×Y/n in size as shown by the compressed, inverted, greyscale image in FIG. 24. n can be any integer number (e.g., 16 as illustrated) with X/n and Y/n also integer values. In the present example, a bright pupil will be found, thus the picture is inverted so that black becomes white and vice-versa. In the Figures to follow, the pupil will be dark against a brighter background as in FIG. 25.

2. Calculate Threshold

Figure 26:
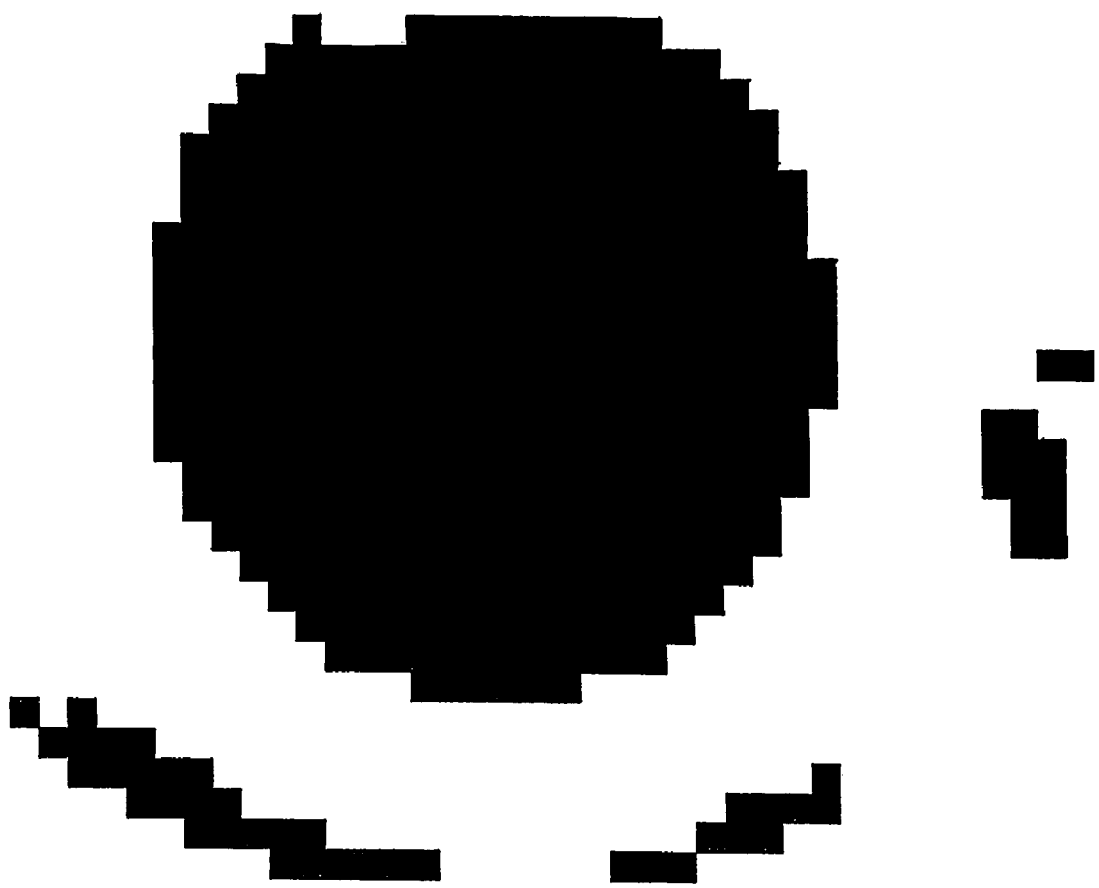

A threshold value for the compressed image is now calculated. All pixels that have a signal greater than the threshold are set to white (signal=255), all other pixels are set to black (signal=0), yielding a binary black and white image as shown in FIG. 26 (binary black and white image means that every pixel is either completely black or completely white). Illustratively, the threshold is calculated as follows:

threshold=(maximum signal in image)−(average signal in image/4)

if the maximum is smaller than (4/3*Average signal); otherwise, threshold=(maximum signal in image)−(average signal in image/3)

if the maximum is bigger than (4/3*Average signal).

Other ways of calculating a threshold can easily be determined by those skilled in the art 3. Calculate Pupil Now, in the binary black and white image, the center of mass for the black pixels is calculated, yielding the center of the pupil. The standard deviation of the black pixels in the X and Y direction is also calculated. For an ellipse, the axis length (of the short and long axes that define the ellipse) is four times the standard deviation. Using the doubled standard deviation as a radius, a rough position and X and Y diameter of the pupil is obtained.

4. Image Filtering

The result of step 3 may be inaccurate due to bright points in regions inside the pupil or reflexes in the image, which regions are now removed. To accomplish this we take the original compressed greyscale image from step 1 and plot the obtained pupil ellipse into this image and for all points inside this ellipse. All pixel signals that are larger than the average signal (inside the circle) are set to the average signal. This procedure removes bright points within the pupil as illustrated by the filtered image in FIG. 27.

5. Refinement 1

Figure 27:
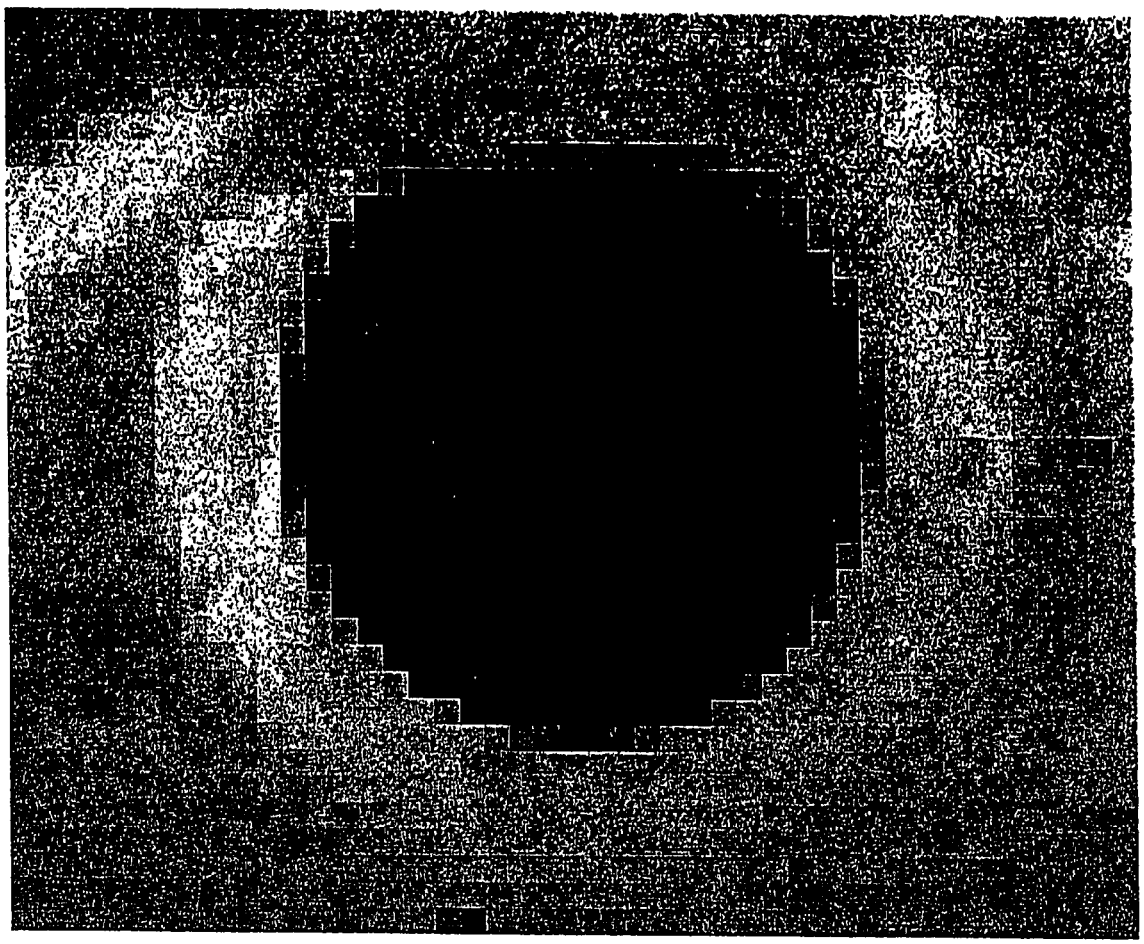
Figure 28:
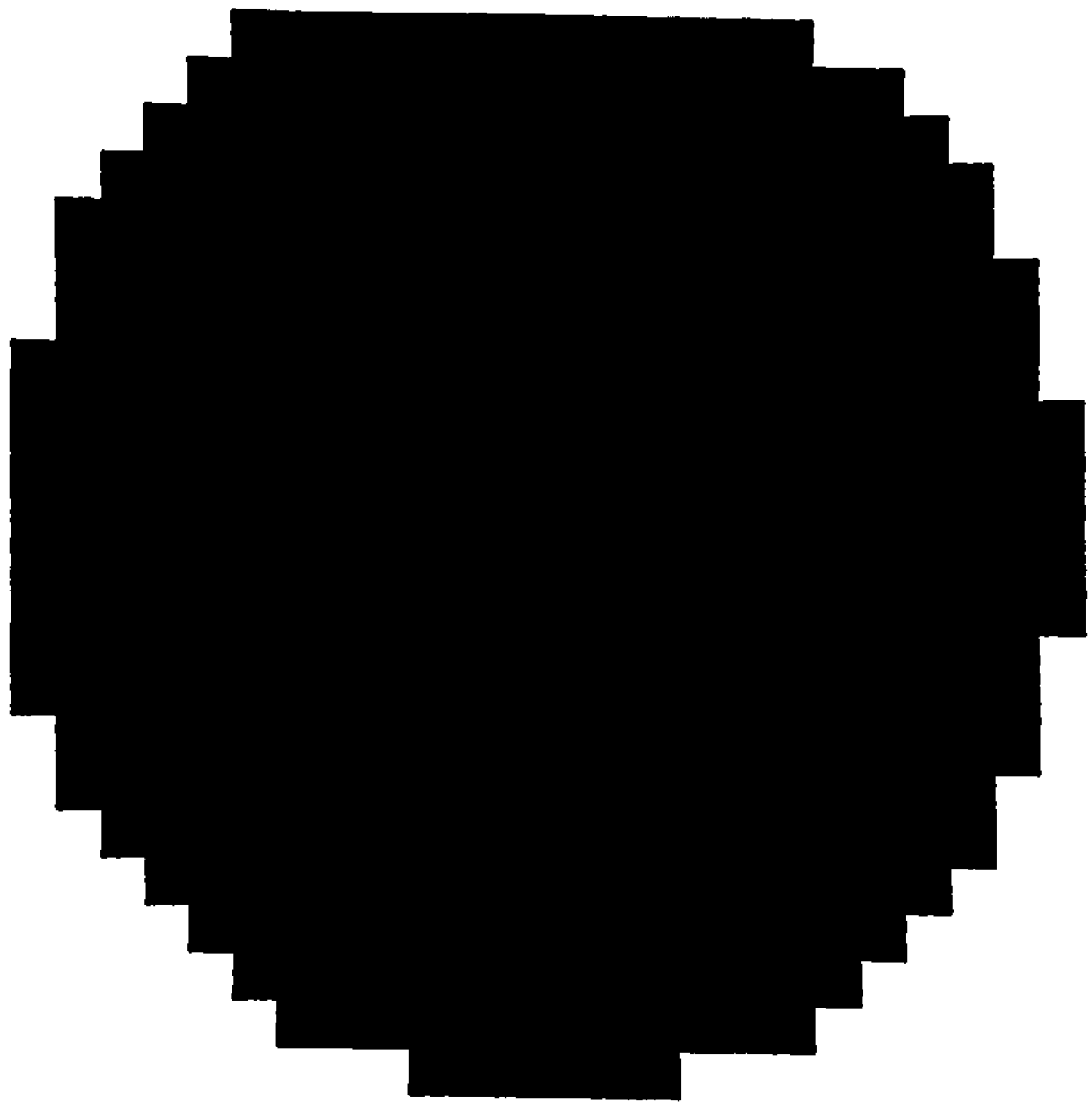

The pupil circle in the image of FIG. 27 is now enlarged by 20%, and all pixels outside the circle are set to white based upon the assumption that they are in fact outside the pupil. This is also a means of reflex removal. To refine the result, steps 2 and 3 are repeated with this image. In this process the greyscale image is converted into a black and white image. It is possible to enlarge the pupil circle by between about 5% to 25%, appreciating that if the percentage enlargement is too great, then the reflex removal outside of the pupil may not be efficient On the other hand, if the percentage enlargement is too small, then parts of the pupil may be wrongly eliminated due to inaccuracy of the prior pupil center calculation.

6. Reflex Removal

To further remove reflexes, the center of the pupil found in step 3 is scanned in the X-X and Y-Y directions. While scanning along the X-axis, the fringe of the black region is explored. The fringe is assumed to be reached when at least three consecutive white pixels are found (in the binary black and white picture). This produces four fringe points, which are then connected by a ellipse that is fitted to these points. Outside this ellipse every pixel is set to white, inside every pixel is set to black as illustrated by the image in FIG. 28. Step 3 is then repeated with the actual image.

7. Refinement 2

Figure 29:
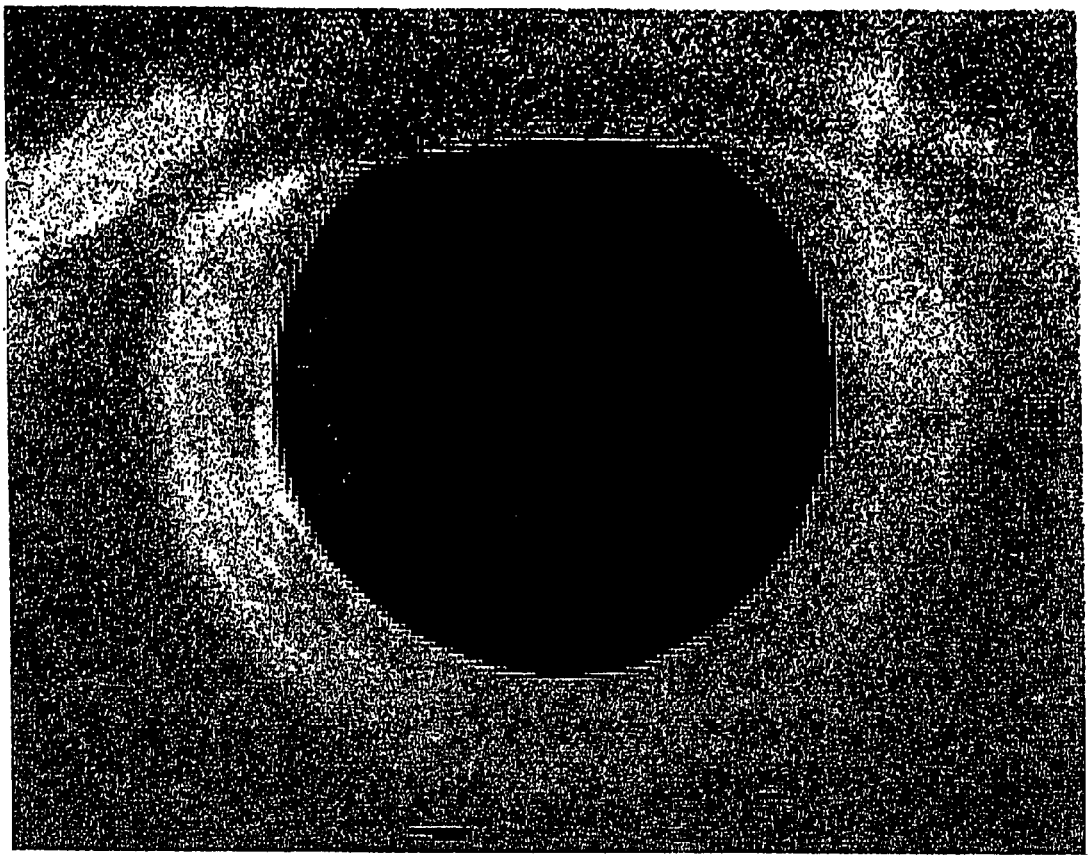
Figure 30:
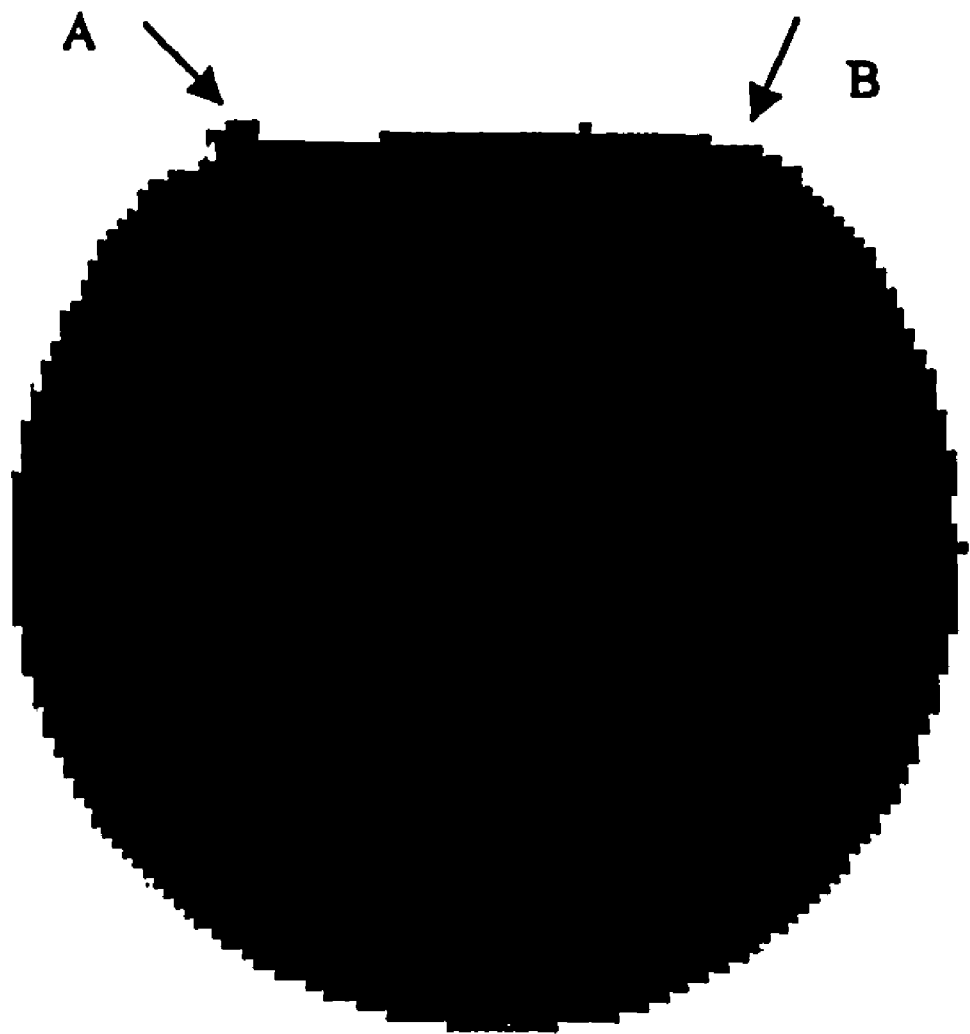
Figure 31:
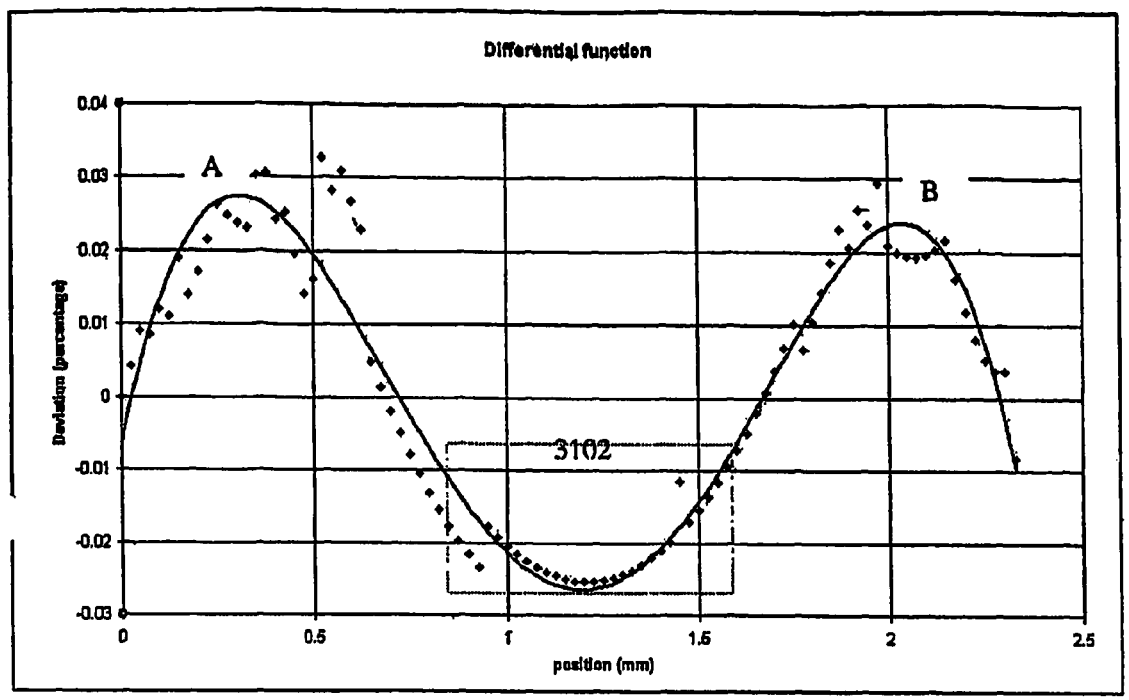

As described above in regard to the centroiding algorithm, the compressed images make the algorithm fast, but at the expense of less accuracy because of the information lost in the compression process. Therefore, a picture that is only compressed by a factor of four from the original image (FIG. 24), illustrated by the image in FIG. 29, is used for the next refinement step (the factor could be any number lower than 10). To save time, this image is created in step 1 during the compression process and is stored until it is used in this step. Now, the complete process is iterated with this lower compression image. That is, using the pupil position data obtained in step 6, step 4 is repeated with the actual (lower compressed) image. Step 5 is repeated with an enlargement factor of 15%, and then step 6 is repeated. (Note that steps 5 and 6 include repetitions of steps 2 and 3). The completed process provides an accurate position of the pupil and its diameter in X and Y direction as illustrated by the image in FIG. 30. The enlargement factor range discussed in step 5 above also applies in the instant step.

8. Eyelid-Correction

A check is now performed for eyelids that might shade parts of the pupil and thus obscure the result of the above process. Using the last binary black and white image (FIG. 29; four-x compression of original) from the above process, we now look for the fringe of the black region in the upper half of the pupil. This is accomplished by performing the same scan as set forth in step 6, but for every column that contains the pupil ellipse rather than along the coordinate axes. This allows for the computation of the difference between the found ellipse and the fringe of the black pupil as a function of X position, illustrated by the plot shown in FIG. 10. If the eyelid extends inside the pupil region, the upper region of the pupil will be flat and the found ellipse will be too small. Therefore the above mentioned difference function (see FIG. 10) will have two maxima (A and B) and a minimum in between. To avoid erroneous correction of blinks, the correction is only done if the two maxima are at least 20% of the pupil diameter, or five pixels apart; the average absolute difference is at least 0.75% of the diameter; and, the average minimum is at least 1% of the image height below zero. As the minimum fluctuates, we have taken the average between 0.4 and 0.6 times the pupil diameter, shown as marked region 3102 in FIG. 31. If all of the above conditions have been met, a lid correction is performed as follows: We take the arc of the found pupil ellipse between the X-positions of the two maxima and paste it in between points A and B, such that it spans the region where the lid has a cut similar to that of the pupil shape. The enclosed region is set to black as shown by the grey region marked 3202 in FIG. 32, 9. Final Calculation.

Figure 32:
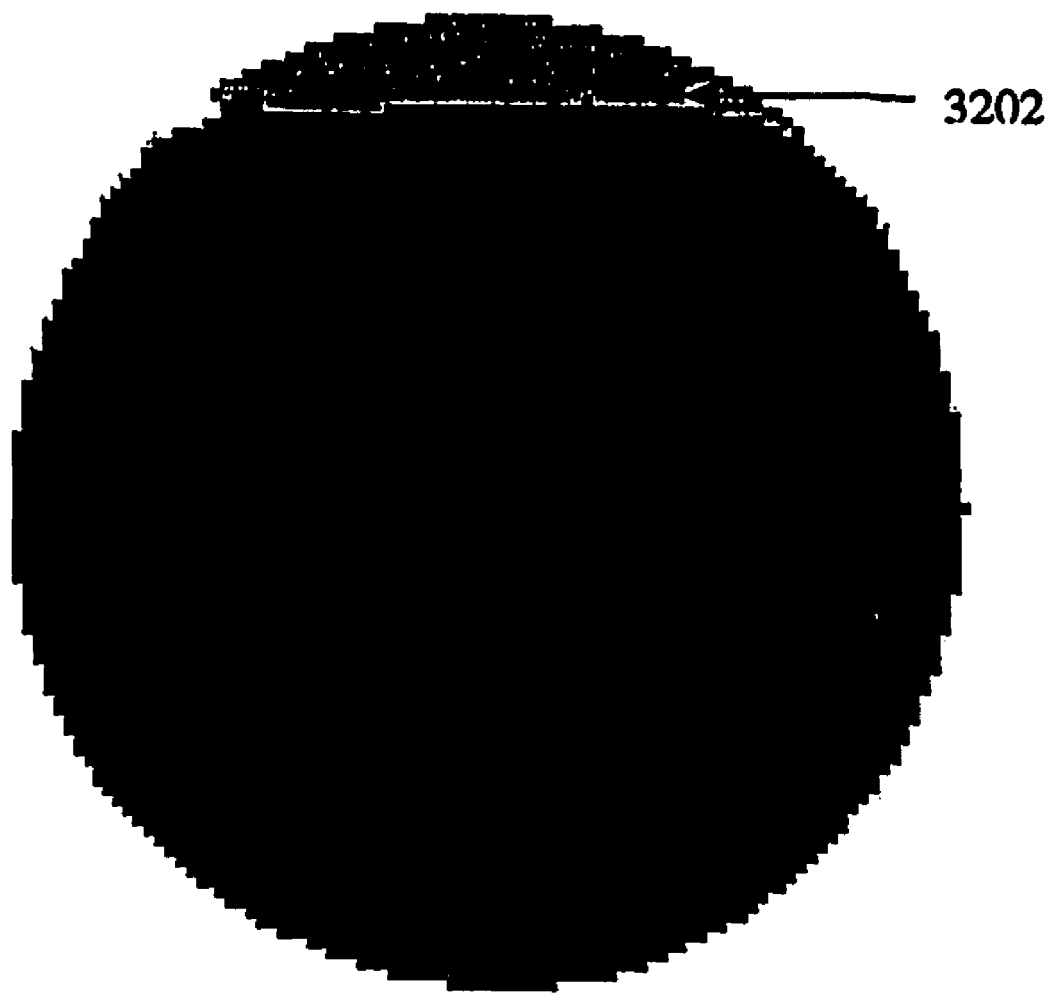

The pupil is finally calculated (see step 3) for the lid-corrected black and white image yielding the result illustrated by the image shown in FIG. 32. Alternatively, it is possible to do Refinement 2 (step 7) with the original uncompressed image. This approach will not be necessary if the process with the n=4 compressed image provides the desired measurement accuracy. In an exemplary case of online measurement at a repetition rate of 20-25 Hz, the achieved transitional position accuracy of the contact lens was ±70 μm, and lens rotational accuracy was ±2°.

We claim:

1. A computer-implemented method for use with an aberrometer/wavefront sensor system for determining pupil parameters, comprising the steps of:
    a) obtaining a pupil image;
    b) compressing the pupil image by a selected amount, n, and compressing the pupil image by a different selected amount, $n_1 < n$, where $n_1 < 10$;
    c) calculating a threshold value for the compressed pupil image;
    d) determining a center parameter value of the pupil;
    e) determining a multiple-coordinate axes diameter parameters of the pupil;
    f) determining a perimeter shape of the pupil based upon the center and multiple-coordinate axes parameters;
    g) plotting the shape into the compressed image and determine average pixel signal values inside of the perimeter;
    h) enlarging the perimeter by a selected amount, Δ, and repeat steps (c, d) on a new image with the enlarged perimeter;
    i) determining a fringe point position at each end of each of the diameter coordinate axes, and fitting a perimeter shape to the points;
    j) repeating step (d) on an image obtained from step (i);
    k) repeating step (g) on the $n_1$ compressed pupil image;
    l) repeating step (h) on the step (k) image, with a $\Delta_1 < \Delta$;
    m) repeating steps (d, e) on the step (l) image;
    n) making an eyelid-correction on the step (m) image; and
    o) repeating steps (d, e) on the step (n) image.

2. The method of claim 1, where n is an integer, and $1 \leq n < 20$.

3. The method of claim 1, wherein step (c) comprises creating a binary image by setting all pixel values below the threshold to a zero value and all pixel values above the threshold to a high value.

4. The method of claim 3, wherein a center of mass is determined for the zero value pixels as well as a standard deviation, which is used to determine diameter values along an x-coordinate axis and a y-coordinate axis.

5. The method of claim 4, wherein the perimeter shape is an ellipse.

6. The method of claim 5, wherein Δ is in a range between about 5% to 25%, and $\Delta_1$ is in a range between about 5% to 25%.

7. The method of claim 6, wherein step (i) comprises fitting an ellipse to fringe points at each end of the x-coordinate axis and a y-coordinate axis.

8. The method of claim 7, wherein step (n) comprises scanning every pixel column that contains a found ellipse perimeter, and computing a difference function between the ellipse perimeter and the pupil fringe as a function of X-position.

9. The method of claim 8, comprising determining at least two maxima and a minimum in between said maxima of the difference function and, based upon satisfying a selected error-criteria, locating an arc of the found ellipse between the X-positions of the two maxima.

10. The method of claim 9, comprising determining the pupil center parameter and the pupil size parameter.

* * * * *